(12) United States Patent
Chojnacki

(10) Patent No.: US 7,640,595 B2
(45) Date of Patent: Dec. 29, 2009

(54) COMPUTING SYSTEM WITH DECRYPTION FUNCTIONS AND SECURE DATA PRODUCT

(75) Inventor: Robert Chojnacki, Chicago, IL (US)

(73) Assignee: Navteq North America, LLC, Chicago, IL (US)

( * ) Notice: Subject to any disclaimer, the term of this patent is extended or adjusted under 35 U.S.C. 154(b) by 866 days.

(21) Appl. No.: 10/823,132

(22) Filed: Apr. 13, 2004

(65) Prior Publication Data

US 2004/0193364 A1 Sep. 30, 2004

Related U.S. Application Data

(63) Continuation of application No. 09/663,893, filed on Sep. 18, 2000, now Pat. No. 6,768,942.

(51) Int. Cl.
*H04L 9/18* (2006.01)
*H04L 9/34* (2006.01)

(52) U.S. Cl. .................... 726/30; 380/280; 713/161

(58) Field of Classification Search ............ 713/161, 713/167; 380/262, 280; 726/26, 30
See application file for complete search history.

(56) References Cited

U.S. PATENT DOCUMENTS

| | | | |
|---|---|---|---|
| 5,412,718 A | 5/1995 | Narasimhalu et al. | 705/51 |
| 5,623,546 A | 4/1997 | Hardy et al. | 380/4 |
| 5,654,746 A | 8/1997 | McMullan, Jr. et al. | 348/6 |
| 5,764,762 A | 6/1998 | Kazmierczak et al. | 380/4 |

(Continued)

FOREIGN PATENT DOCUMENTS

EP  792041 A2 * 8/1997

(Continued)

OTHER PUBLICATIONS

Schneier, B., Chapters 18 and 19, *Applied Crypotograph—Protocols, Algorithms, and Source Code in C*, (2d ed., John Wiley & Sons, Inc. 1996).

(Continued)

*Primary Examiner*—Jung Kim
*Assistant Examiner*—Venkat Perungavoor
(74) *Attorney, Agent, or Firm*—Jon D. Shutter; Frank J. Kozak; Lisa M. Schoedel

(57) ABSTRACT

A navigation system with decryption functions. The navigation system may receive from a portable data storage medium an encrypted authentication key, an encrypted first portion of a geographic database, and an unencrypted second portion of the geographic database. The navigation system may then decrypt the encrypted authentication key so as to gain access to a set of verification information and to a decryption key for decryption of the encrypted first portion. The navigation system may then use the verification information to validate use of the database, such as by ensuring that the data storage medium is authorized to hold the database or that the navigation system is authorized to access the database. In turn, the navigation system may then use the decryption key to decrypt the encrypted first portion, so as to gain access to the database as a whole. The navigation system may then use information in the database to convert location coordinates into map information for presentation to a user. Also disclosed is a secure geographic database for use with a navigation system.

14 Claims, 13 Drawing Sheets

U.S. PATENT DOCUMENTS

| | | | |
|---|---|---|---|
| 5,805,551 A | 9/1998 | Oshima et al. | 705/57 |
| 5,845,067 A | 12/1998 | Porter | 713/200 |
| 5,857,020 A | 1/1999 | Peterson, Jr. et al. | 380/4 |
| 5,887,269 A | 3/1999 | Brunts et al. | 701/200 |
| 5,917,908 A | 6/1999 | Takenaka et al. | 380/3 |
| 5,938,721 A | 8/1999 | Dussell et al. | 701/211 |
| 5,951,620 A | 9/1999 | Ahrens et al. | 701/200 |
| 5,987,124 A * | 11/1999 | Matyas et al. | 380/37 |
| 5,999,622 A | 12/1999 | Yasukawa et al. | 380/4 |
| 6,035,039 A | 3/2000 | Tisdale et al. | 380/23 |
| 6,049,830 A | 4/2000 | Saib | 709/231 |
| 6,052,645 A | 4/2000 | Harada | 701/212 |
| 6,073,214 A | 6/2000 | Fawcett | 711/133 |
| 6,104,815 A * | 8/2000 | Alcorn et al. | 380/251 |
| 6,107,944 A | 8/2000 | Behr et al. | 340/995 |
| 6,126,071 A | 10/2000 | Yoshimura | 235/382 |
| 6,131,066 A | 10/2000 | Ahrens et al. | 701/200 |
| 6,138,236 A * | 10/2000 | Mirov et al. | 726/26 |
| 6,151,624 A | 11/2000 | Teare et al. | 709/217 |
| 6,199,045 B1 | 3/2001 | Giniger et al. | 705/1 |
| 6,204,774 B1 | 3/2001 | Miwa et al. | 340/825.31 |
| 6,237,786 B1 | 5/2001 | Ginter et al. | 213/153 |
| 6,289,276 B1 | 9/2001 | Ahrens et al. | 701/200 |
| 6,297,891 B1 | 10/2001 | Kara | 358/405 |
| 6,308,179 B1 | 10/2001 | Petersen et al. | 707/102 |
| 6,314,409 B2 | 11/2001 | Schneck et al. | 705/54 |
| 6,408,307 B1 | 6/2002 | Semple et al. | 707/104.1 |
| 6,473,860 B1 | 10/2002 | Chan | 713/193 |
| 6,522,875 B1 | 2/2003 | Dowling et al. | 455/414.3 |
| 6,615,349 B1 | 9/2003 | Hair | 713/165 |
| 6,768,942 B1 * | 7/2004 | Chojnacki | 701/200 |
| 7,051,211 B1 * | 5/2006 | Matyas et al. | 713/187 |
| 2001/0032088 A1 | 10/2001 | Utsumi et al. | 705/1 |
| 2004/0039741 A1 | 2/2004 | Benson et al. | 707/9 |

FOREIGN PATENT DOCUMENTS

| | | |
|---|---|---|
| WO | WO 9909374 | 2/1999 |
| WO | WO 01/57469 | 8/2001 |

OTHER PUBLICATIONS

Riordan et al., Environmental Key Generation towards Clueless Agents (http://www.counterpane.com/clueless-agents.html), pp. 1-10, before Sep. 2000.

"Announcing Development of a Federal Information Processing Standard for Advanced Encryption Standard", Department of Commerce, *National Institute of Standards and Technology*, (Docket No. 960924272-6272-01, RIN # 0693-ZA13) pp. 1-5, Jan. 1997.

Schneier, B., Counterpane Systems: Security Pitfalls in Cryptography, (http://www.counterpane.com/pitfalls.html) pp. 1-11, 1998.

RSA Security, Inc., PKCS31 v. 2.1: RSA Cryptography Standard, (http://www.rsasecurity.com/rsalabs/pkcs/pkcs-1/index.html), pp. 1-47, 1999.

Jurisic et al., Elliptic Curves and Cryptography, (http://www.certicom.com/research/download/paper4wd.zip) pp. 1-13, before Sep. 2000.

Certicom, Current Public-Key Cryptographic Systems, ECC: The Elliptic Curve Cryptosystem, (http://www.certicom.com/research/download/eccwhit1.zip) pp. 1-17, 1997.

Schneier, B., Security in the Real World. How to Evaluate Security Technology, *Computer Security Journal*, vol. XV, Nov. 1999.

Schneier, et al., Twofish: A 128-Bit Block Cipher, (http://www.counterpane.com/twofish.html), pp. 1-68, Jun. 1998.

* cited by examiner

COMPUTING SYSTEM WITH DECRYPTION FUNCTIONS AND SECURE DATA PRODUCT

REFERENCE TO RELATED APPLICATIONS

The present application is a continuation of Ser. No. 09/663,893 filed Sep. 18, 2000, now U.S. Pat. No. 6,768,942 the entire disclosure of which is incorporated herein by reference.

INCORPORATION BY REFERENCE

This specification is filed contemporaneously with two other U.S. patent applications, entitled respectively "Method and System for Mass Distribution of Geographic Data for Navigation Systems" and "Encryption Method for Distribution of Data," each by the same inventor as the present invention, and each assigned to the owner of the present invention. The entirety of each of these other applications is hereby incorporated by reference.

This specification is also related to the subject matter of U.S. Pat. No. 5,951,620 (the '620 patent), which is entitled "System and Method for Distributing Information for Storage Media," and which issued on Sep. 14, 1999 to Navigation Technologies Corporation of Rosemont, Ill. The entirety of the '620 patent is also hereby incorporated by reference.

BACKGROUND OF THE INVENTION

1. Field of the Invention

The present invention relates to a system and method for secure distribution of digital data to end users' media for use by the end users. More particularly, the present invention relates to systems and methods for distributing geographic data to end users for use in their navigation systems.

2. Description of Related Art

There are various different types of devices for which end users are required to obtain digital data. One type of device for which end users are required to obtain digital data is a navigation system. Navigation systems for use on land have become available in a variety of forms and provide for a variety of useful features. One exemplary type of navigation system uses (1) a geographic database that contains data representing features in a geographic area or region, (2) a navigation application program, (3) appropriate computer hardware, such as a microprocessor and memory, and, optionally, (4) a positioning system. The geographic database portion of the navigation system includes information about the positions of roads and intersections in or related to a specific geographic regional area, and may also include information about attributes, such as one-way streets and turn restrictions, as well as about street addresses, alternative routes, hotels, restaurants, museums, stadiums, offices, automobile dealerships, auto repair shops, etc.

The positioning system may employ any of several well-known technologies to determine or approximate one's physical location in a geographic regional area. For example, the positioning system may employ a GPS-type system (global positioning system), a "dead reckoning"-type system, or combinations of these, or other systems, all of which are well-known in the art.

The navigation application program portion of the navigation system is typically a software program that uses data from the geographic database and the positioning system (when employed). The navigation application program may provide the user with a graphical display (e.g. a "map") of his specific location in the geographic area. In addition, the navigation application program may also provide the user with specific directions to locations in the geographic area from wherever he is located.

The geographic data used by a navigation system may be stored locally with the navigation system in the vehicle, or, alternatively, the geographic data may be located remotely and downloaded to the navigation application programs, as needed, via a wireless communications system or other suitable communications channel. An advantage associated with having the geographic data stored locally with the navigation system is that a large amount of data is continuously available to the navigation system, thereby avoiding the costs associated with installing and maintaining a communications infrastructure that affords the necessary bandwidth needed to provide the data from a remote site. On the other hand, a consideration associated with storing geographic data locally with the navigation system is the need to update the data on a regular basis.

Accordingly, there is a need for a system and method for the distribution of new and updated geographic data to users of navigation systems.

Another consideration associated with providing geographic data for navigation systems is the need to safeguard the data from unlicensed uses, e.g., illegal copying. The collection of geographic data can be a relatively time-consuming and expensive process. Therefore, although it is desirable to make it easy for users of navigation systems to obtain new and updated geographic data, it is also desired to provide security measures that prevent unlicensed uses.

As mentioned above, there are various different types of devices for which end users are required to obtain digital data. Other devices include music players (e.g., audio CD players, MP3 players, as well as players that support other formats), video game consoles, DVD players, and computers. The considerations relating to safeguarding of geographic data from unlicensed uses also applies to data provided for these other types of devices.

SUMMARY

The present invention provides a navigation system with decryption functions. The navigation system may include a GPS receiver for receiving location coordinates, and a display or other means for presenting map information to a user. The navigation system may further include a processor arranged to execute a number of software routines. One such routine may be executable by the processor for using the geographic data to convert the location coordinates into map information and for causing to the map information to be presented via the means for presenting.

The navigation system may be an in-vehicle navigation system, which may be installed within the dashboard of a vehicle for instance. Alternatively, the navigation system may be a battery-powered handheld unit. Still alternatively, the navigation system may take other forms.

In an exemplary embodiment, the navigation system may be arranged to receive a set of information from a portable data storage medium, such as a flash memory card for instance. The set of information may include (i) an authorization key and (ii) geographic data. The authorization key may define verification information, such as an indication of an entity authorized to access the geographic data and an indication of an entity authorized to hold the geographic data. The geographic data may be divided into at least a first portion and a second portion. The first portion may comprise critical information, such as decompression parameters, indexes and other global parameters, that enables access to the second portion, so as to allow the navigation system to provide navigation services for a user.

On the data storage medium, the first portion of the geographic data may be encrypted, and the authorization key may be encrypted, while the second portion may remain unencrypted. Therefore, the navigation system may receive from the data storage medium (i) the encrypted first portion, (ii) the unencrypted second portion, and (iii) the encrypted authorization key. Further, the decryption key required for decryption of the encrypted first portion could be stored as part of the authorization key. In this way, the navigation system would need to be able to decrypt the authorization key in order to gain access to the first portion of the database and in turn to the database as a whole.

In an exemplary embodiment, the navigation system may include a number of software routines executable by the processor for (i) decrypting the encrypted authorization key so as to uncover the verification information and the decryption key, (ii) using the verification information to validate use of the database, and (iii) in response to successful validation, decrypting the encrypted first portion and then causing the processor to execute the routine mentioned above for using the geographic data to convert location coordinates into map information.

The process of using the verification information to validate use of the database may involve comparing at least a portion of verification information to an identification code associated with the data storage medium or with the navigation system itself. In this way, the navigation system can determine whether the data storage medium is authorized to hold the database and/or whether the navigation system itself is authorized to use the database.

In another embodiment, the navigation system may further include a port for communication with a remote entity via a wireless telecommunications network (such as a cellular telephone system, for instance) or other suitable link. With this arrangement, the navigation system may obtain from the data storage medium the encrypted first portion of the database and the unencrypted second portion of the database. In turn, the navigation system may be programmed to contact the remote entity via the wireless network and to request the authorization key. The remote entity may then send the encrypted authorization key to the navigation system via the wireless network. From that point on, the navigation system may operate as indicated above for instance.

According to further aspects, the present invention relates to an article of manufacture containing a secured data product. In an exemplary embodiment, the article includes a medium and a data product stored on the medium. The data product may include an encrypted first portion and an unencrypted second portion. The first portion may comprise critical data that enables use of the data product including both the first portion and the second portion for an intended purpose. For instance, the critical data may comprise indexes or pointers into the second portion, the critical data may comprise parameters indicative of how a machine can decompress the second portion, or the critical data may comprise other global parameters relating to the data product as a whole.

The encrypted first portion of the data product can itself include a first part (e.g., an authentication key) that is encrypted using public key encryption and a second part (e.g., the critical data from the database) that is encrypted using symmetric key encryption. Advantageously, the symmetric key for decrypting the second part may be contained in encrypted form in the first part. With this exemplary arrangement, the first part must be decrypted in order to uncover the symmetric key that is needed to decrypt the second part, and to thereby obtain access to the data product as a whole.

The data product may, for example, be a geographic database, which may be intended for use by a navigation system (such as in-vehicle navigation systems, handheld (portable) navigation systems, or general purpose computing devices equipped with navigation system functionality, for instance). Alternatively, the data product may take other forms, such as, for instance, digitized songs or videos (e.g., movies) intended for use by music or video players, or games intended for use by video game consoles. Other examples are possible as well.

The article may take the form of a flash memory card, a PC card (e.g., PCMCIA card), or the like, which may include (i) a housing, (ii) a storage segment holding a set of information, and (iii) an interface extending from the housing for coupling the storage segment with a machine (such as a navigation system, for instance). The storage segment may comprise a non-volatile storage medium, such as flash memory.

Preferably, the article has dimensions and storage capacity that conform with industry standards and that are sufficient to store a data product for the intended purpose. Thus, for instance, the article may have dimensions and an interface that conform with PCMCIA standards. Alternatively, for instance, the article may have dimensions and an interface that conform with SDA standards.

The set of information may include an encrypted authorization key and a set of data. Further, the encrypted authorization key can be decrypted using of a first decryption key so as to reveal a plaintext (i.e., non-encrypted) authorization key that defines verification information indicative of an entity authorized to hold the set of data. The machine may then (i) obtain the encrypted authorization key from the storage segment via the interface, (ii) use the first decryption key to decrypt the encrypted authorization key, (iii) uncover the verification information, and (iv) use the verification information to determine that the portable data storage medium is the entity authorized to hold the set of data.

The information indicative of the entity authorized to hold the set of data may comprise an identification code of a data storage medium. The machine may then compare the identification code with an identification code of the portable data storage medium on which the data product is stored so as to determine that the portable data storage medium is the entity authorized to hold the data.

Further or alternatively, the information indicative of the entity authorized to hold the set of data may comprise an identification code of an entity authorized to access the data. A machine may then compare the identification code with its own identification code so as to determine whether it is the entity authorized to access the data.

These and other objects and advantages of the present invention will become apparent to those of ordinary skill in the art by reading the following detailed description, with appropriate reference to the accompanying drawings.

BRIEF DESCRIPTION OF THE DRAWINGS

Preferred embodiments of the present invention are described herein with reference to the drawings, in which.

DETAILED DESCRIPTION OF EXEMPLARY EMBODIMENTS

A. Exemplary System Architecture

Figure 1:
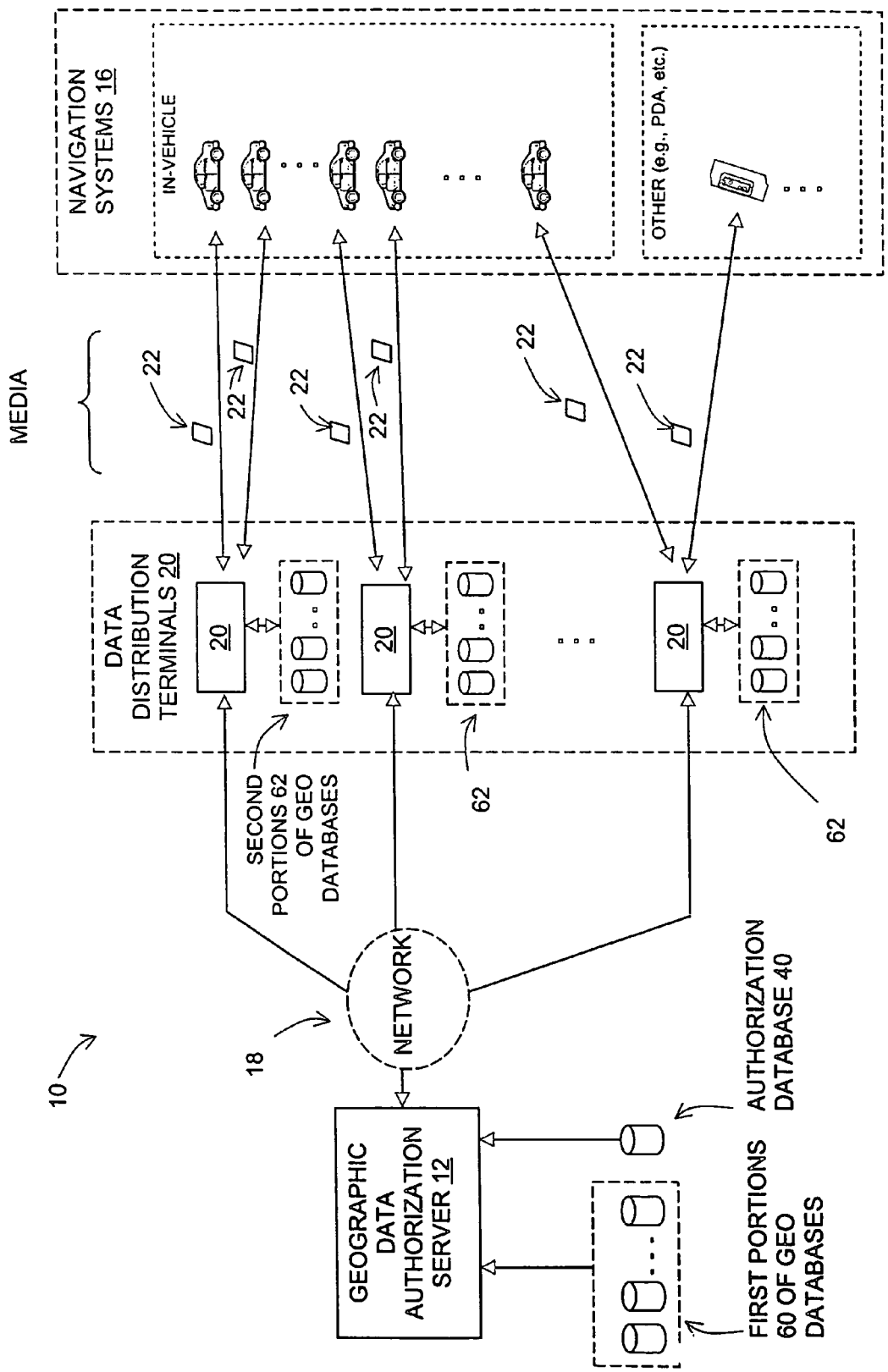
FIG. 1 is a block diagram illustrating a system arranged to facilitate mass distribution of geographic data to one or more navigation systems in accordance with an exemplary embodiment.

Referring to the drawings, FIG. 1 is a block diagram illustrating an exemplary system 10 arranged to facilitate distribution of geographic data to one or more navigation systems 16. System 10 includes an authorization server 12 arranged to be connected by a communications link 18 to a plurality of data distribution terminals 20. Each data distribution terminal is then arranged to provide data to a distribution medium 22, which is, in turn, arranged to provide the data to a navigation system 16.

Communications link 18 can take any of a variety of forms and can include any number of intermediate entities arranged to convey data from one point to another. For example, link 18 can include or take the form of a telecommunications network including wireless communication interfaces (e.g., satellite, radio frequency (RF) cellular, or other interfaces) and/or landline communication interfaces (e.g., the ISDN, cable, fiber, copper, or other interfaces). As a specific example, link 18 may comprise the public switched telephone network. As another specific example, link 18 may comprise the Internet, to which authorization server 12 and each data distribution terminal can be connected by a broadband (e.g., cable or DSL) connection, point-to-point connection, or other suitable link.

Distribution medium 22 may take various forms as well and may vary from terminal to terminal and from navigation system to navigation system. For example, distribution medium 22 may comprise an RF communications link between a terminal 20 and a navigation system 16. As another example, distribution medium 22 may comprise a wired communication link between a terminal 20 and a navigation system 16.

In the exemplary embodiment, distribution medium 22 comprises a portable data storage device, which can be selectively coupled to a distribution terminal 20 and to a navigation system 16. Thus, in operation, geographic data can be communicated from authorization server 12 over link 18 to a data terminal 20. Data terminal 20 can then record data onto a portable data storage device 22, which can then be physically carried to, or otherwise coupled with, a navigation system 16. Navigation system 16 can then read the data from device 22 and use the data to provide navigation services for a user.

This and other arrangements described herein are shown for purposes of illustration only, and those skilled in the art will appreciate that other arrangements and other elements (e.g., machines, interfaces, functions, etc.) can be used instead, additional elements may be added, and some elements may be omitted altogether. Further, those skilled in the art will appreciate that many of the elements and interfaces described herein are functional entities that may be implemented as discrete components or in conjunction with other components, in any suitable combination and location.

It should also be understood that various functions described herein as being performed by one or more entities may be carried out by one or more processors executing an appropriate set of machine language instructions stored in memory. Provided with the present disclosure, those skilled in the art can readily prepare and compile appropriate computer instructions to perform such functions.

Figure 2:
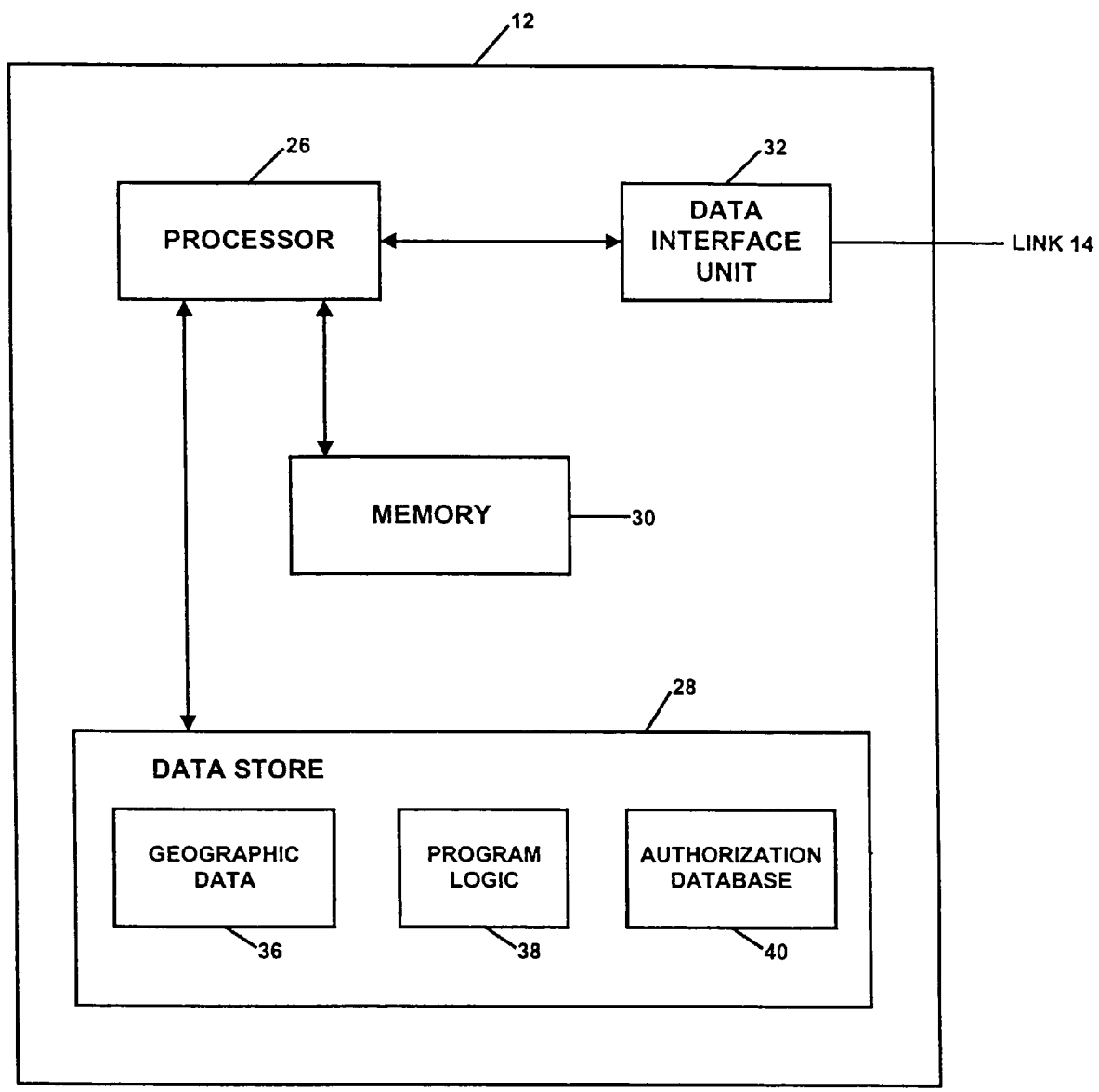
FIG. 2 is a block diagram depicting an exemplary authorization server.

Referring now to FIG. 2, an exemplary authorization server 12 is shown in greater detail. Authorization server 12 may take the form of a general purpose computer programmed with a set of machine language instructions to carry out the functions described below. As shown in FIG. 2, exemplary authorization server 12 may thus include a processor 26, a data store 28, a memory 30 and a data interface unit 32. These components may be coupled together by a system bus or other link to facilitate communication. And the components may take various forms. By way of example, processor 26 may be an Intel Pentium III microprocessor, data store 28 may be a flash memory, ROM and/or magnetic or optical hard disk drive, memory 30 may be volatile RAM (random access memory), and data interface unit 32 may comprise a transceiver, modem, antenna and/or other arrangement suitable for communicating over link 18.

Although FIG. 2 shows components of authorization server 12 within a single entity, those skilled in the art will appreciate that various components could equally be provided as separate entities. For example, all or part of data store 28 could be provided as a database server with a separate processor that is accessible by processor 26 via a computer network or other link.

In an exemplary embodiment, data store 28 may hold three data components: (i) geographic data 36, (ii) program logic 38, and (ii) authorization database 40. Geographic data 36 may comprise one or more databases or data files that define geographical data, such as road geometry attributes and position information, and point-of-interest information. The road geometry attribute and position information may include data about the positions (e.g., latitude and longitude coordinates) of streets and intersections in or related to a specific geographical area, information about one-way streets, street lights, stop signs, turn restrictions, street addresses, speed limits, and the like. Point-of-interest information may include data about the positions of airports, car rental agencies, service centers, restaurants, hotels, health clubs, and the like. The geographical data may include other or different data as well.

Geographic data 36 may also include special databases of information. For example, geographic data may include Fodor's® Restaurant Guide or other such information, which authorization server 12 may provide together with a basic geographic database if desired.

Program logic 38 may comprise a number of machine language instructions that define routines executable by processor 26. In operation, these instructions can be loaded from data store 28 into memory 30 and then executed by processor 26 to carry out functions described below, such as establishing authorization keys and encrypting authorization keys and geographic data, for instance. Program logic 38 also includes an operating system (not shown), such as Unix, Linux® or Microsoft Windows®, for instance.

Authorization database 40 may include information that identifies entities authorized to access and/or possess geographic data. The entities may be, for instance, a user, a navigation system and/or a data storage device (such as a flash memory card or other flash memory medium, for example). Thus, for example, a given user profile record may be keyed to a user ID code and may indicate that (i) the user is authorized to obtain geographic data for a particular geographical area, (ii) a navigation system with a particular navigation system ID code is authorized to access and use the geographic data, and (iii) a storage device with a particular storage device ID code is authorized to hold the geographic data.

Authorization database 40 may also define algorithms and keys that authorization server 12 may use to encrypt and/or otherwise secure geographic data. The process or keys used to encrypt or otherwise secure data may vary depending on the make and model of the navigation system that is expected to access the data, or depending on other factors. For instance, each model navigation system may have a predetermined decryption key that can be used to decrypt data encrypted using a corresponding encryption key and/or corresponding encryption algorithm. More specifically, each model navigation system may have its own private/public key pair. Authorization database 40 may therefore indicate, for each model navigation system, the encryption key and/or algorithm to be used for securing data that will be accessed by that model navigation system. (Data could be encrypted using a private key and then decrypted by the navigation system using the corresponding public key, or vice versa.)

In practice, the geographic data that is stored in data store 28 will be updated regularly, through a time consuming and costly process of surveying roads and points of interest and collecting and compiling data. Consequently, authorization server 12, and particularly data store 28, is preferably maintained in a physically secure location, so as to guard against theft or misappropriation of the geographic data. Authorization server 12 may be owned and operated by a geographic data supply company, such as Navigation Technologies Corporation, of Rosemont, Ill., which provides geographic data for use in mapping and navigation systems.

As indicated above, geographic data can be recorded on portable data storage device 22, which can then conveniently be provided to a navigation system 16. The storage device is preferably portable (e.g., small and lightweight enough to carry), secure, nonvolatile, readable and re-writeable. Further, the storage device preferably has sufficient storage capacity to hold geographic data for a typical geographical area (such as a city, state, region, or any other sized area). Still farther, to be robust, the storage device is preferably arranged to hold data in an appropriate format, such as the SDAL™ format available from Navigation Technologies Corporation or that is described in U.S. Pat. Nos. 5,968,109, 5,974,419, and 5,953,722. However, storage device 22 can take other forms as well.

In an exemplary embodiment, portable data storage device 22 takes the form of a flash memory card or PC card (PCMCIA card) with housing dimensions, interface dimensions and data storage capacity that conform with industry standards, recommendations or specifications. For example, if the storage device is a flash memory card, the device may confirm with size and capacity parameters conforming with SD Memory Card Specifications (available from the Secure Digital Card Association of Palo Alto, Calif.), which is well known to those skilled in the art. Such cards currently have dimensions of about 31 mm×24 mm×2.1 mm and have storage capacity of 32 megabytes or 64 megabytes of data. As another example, if the storage device is a PCMCIA hard disk card, the device preferably conforms with the PCMCIA standard (such as the PCMCIA Type III standard), which is well known to those skilled in the art. Such PCMCIA cards have dimensions of about 85 mm×54 mm×5 mm and are presently capable of storing about 440 megabytes of data.

Figure 3:
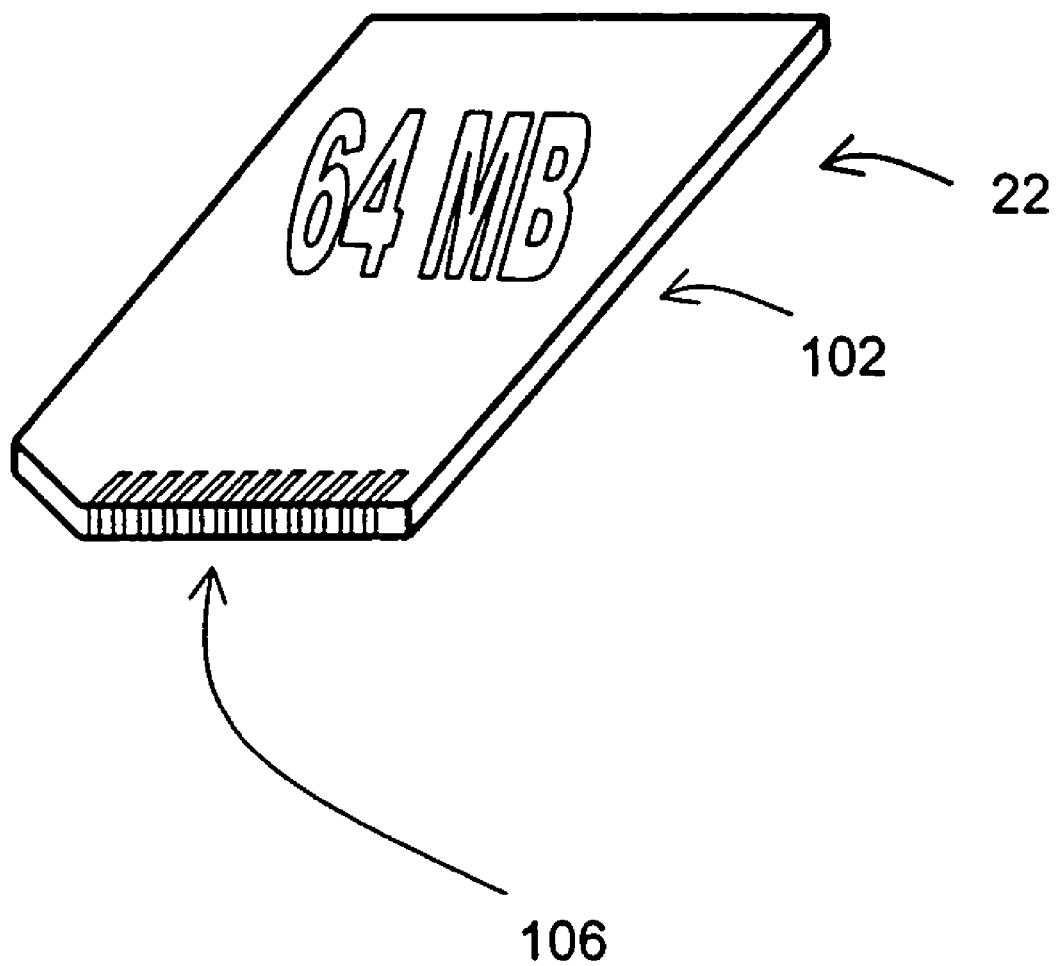
FIG. 3 is a perspective view of an exemplary data storage device for holding secured data.
Figure 4:
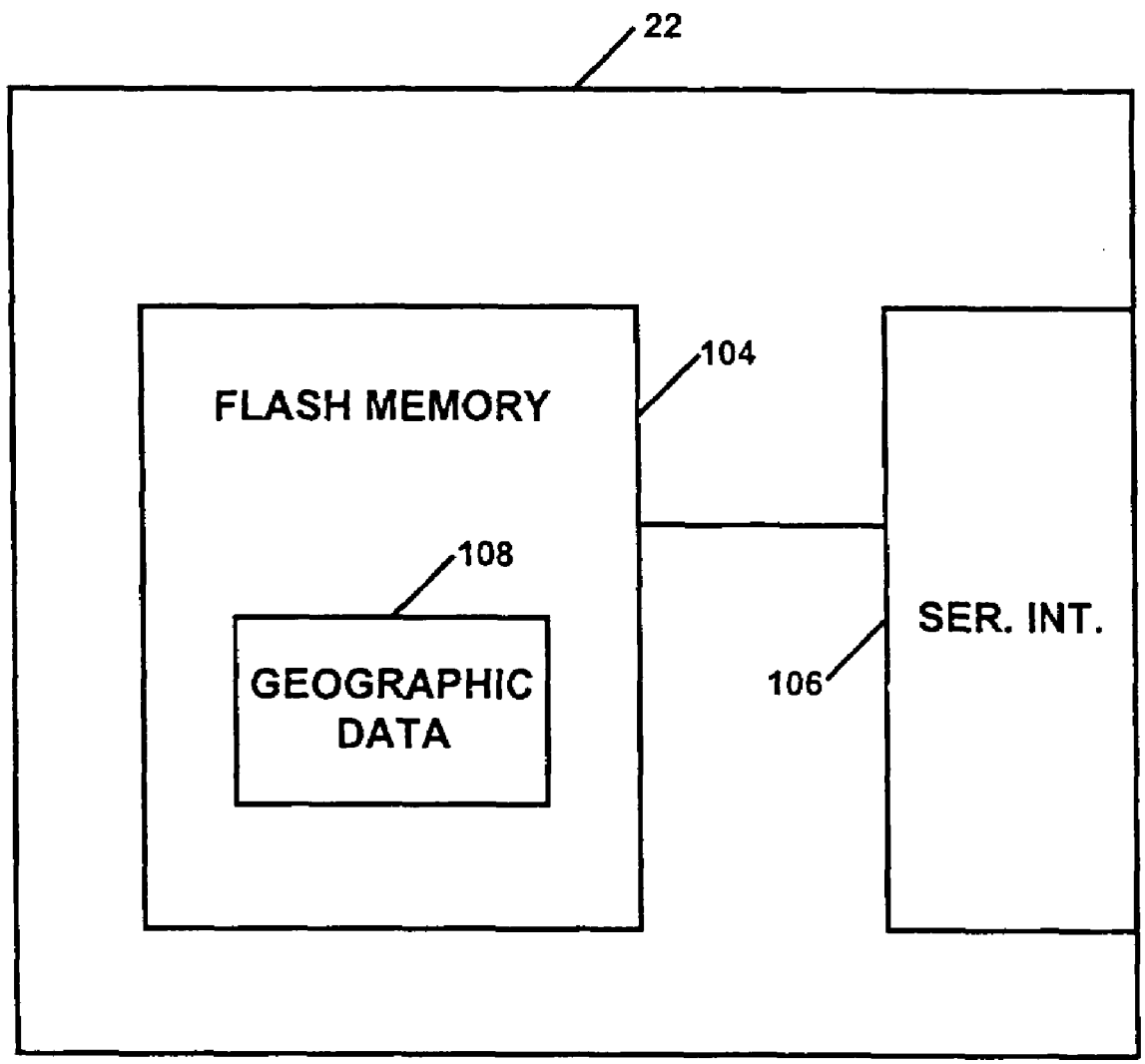
FIG. 4 is a block diagram depicting components of the data storage device of FIG. 3.

FIGS. 3 and 4 illustrate an exemplary portable data storage device 22 in the form of an SD-Card (e.g., a "SanDisk Secure Digital Memory Card," which is a flash memory card manufactured by SanDisk Corporation of Sunnyvale, Calif.). FIG. 3 shows the card in perspective, and FIG. 4 is a schematic block diagram illustrating functional blocks of the card. As shown, exemplary device 22 includes an external housing 102, internal flash memory or other such storage segment 104, and a 9-pin serial interface 106 or other interface on or otherwise extending from the housing. Housing 102 is preferably about 31 millimeters long, 24 millimeters wide and 2.1 millimeters thick, but may be any other desired dimensions as well. Exemplary flash memory 104 may be large enough to hold 64 megabytes of data, by way of example, and is shown to include a set of data 108, such as geographic data and authorization parameters. Serial interface 106 comprises a set of pins or other connectors that can preferably be coupled with a corresponding entity to facilitate reading from, writing to and otherwise controlling the flash memory.

As another example, the portable data storage device 22 could reside in (or could be) a personal data assistant ("PDA"), portable telephone or other such device. Many PDAs exist today and provide either substantial data storage capacity and/or the capability to add expansion data storage. Many PDAs include infrared communication ports or other wireless communication interfaces. In this regard, for instance, the Bluetooth™ specification for short range wireless communications could be employed to enable another entity, such as navigation system 16 for instance, to read from, write to, or otherwise communicate with the PDA.

Portable data storage device 22 preferably has a unique identification (ID) code such as a serial number for instance. This storage device ID is preferably stored permanently in the storage device. For example, the storage device ID could be burned into ROM (read-only-memory) or other permanent storage portion of the device.

Figure 5:
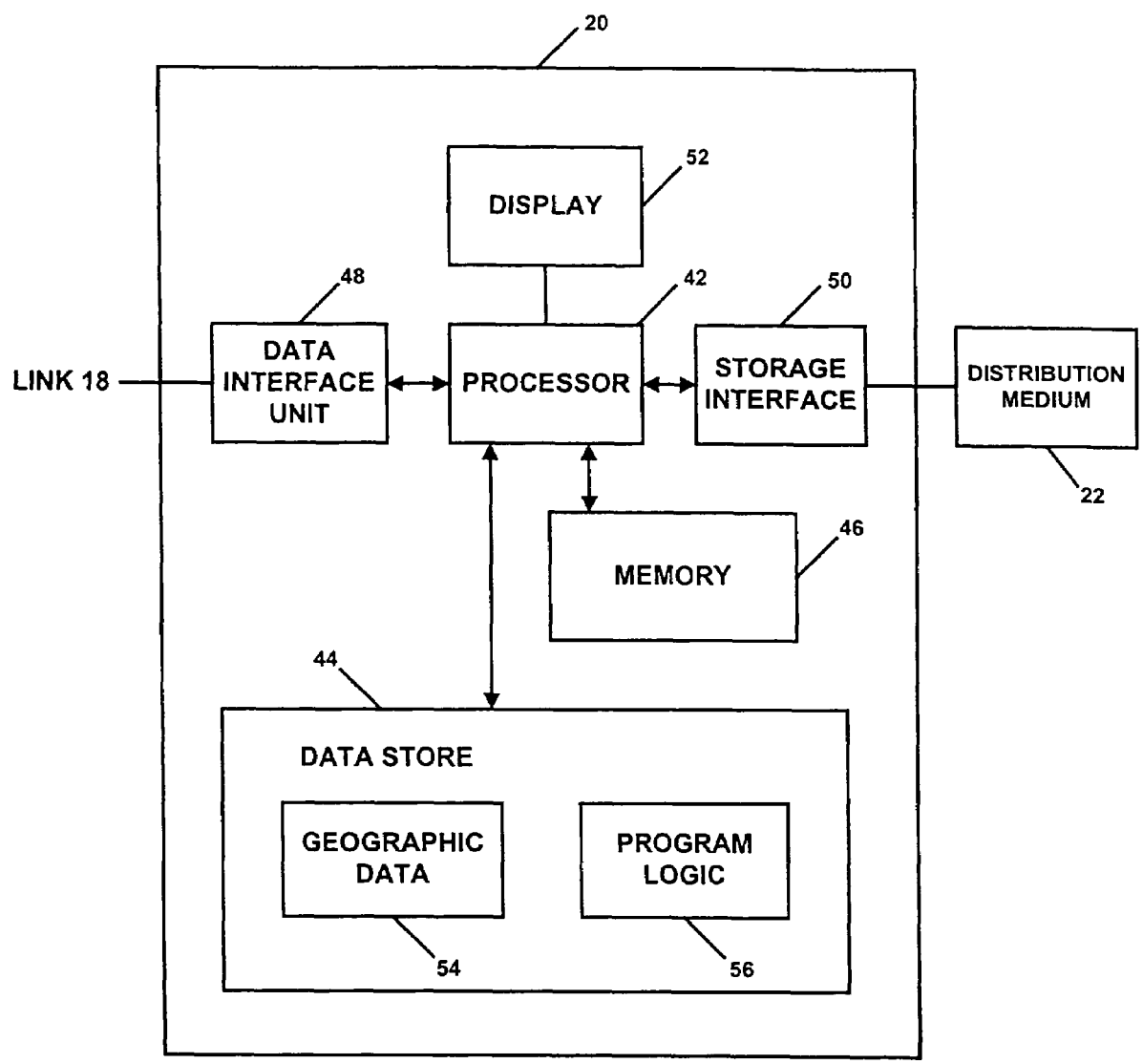
FIG. 5 is a block diagram of an exemplary data terminal.

As indicated above, each intermediate data terminal 20 may be arranged to receive some or all of data 108 from authorization server 12 and to write data 108 onto the portable data storage device 22. FIG. 5 is a schematic block diagram showing an exemplary data terminal 20 in greater detail.

Data terminal 20 can be a general purpose computer programmed with a set of machine language instructions to carry out various functions. By way of example, data terminal 20 can be a personal computer in a home or business and may be accessible by a limited set of users. Alternatively, for example, data terminal 20 can be situated in, or can define, a kiosk or other public display and may be accessible in general by any users.

As illustrated in FIG. 5, data terminal 20 may include a processor 42, a data store 44, a memory 46, a data interface unit 48, a storage device interface 50, and a display 52. These components can be coupled together by a system bus (not shown). Further, each of these components may take various forms. By way of example, processor 42 may be an Intel Pentium III processor, data store 44 may be a flash memory, ROM and/or magnetic or optical hard disk drive, memory 46 may be RAM, data interface unit 48 may comprise a modem, transceiver, antenna and/or other entity suitable for communicating over link 18 (as shown in FIG. 1), interface 50 may be arranged as necessary to read and write data on portable data storage device 22, and display 52 may be a VGA monitor. Other examples are possible as well.

Similar to data interface unit 32 of the authorization server, the arrangement and operation of interface 50 may depend on the arrangement and operation of portable data storage device 22. For example, if device 22 is a flash memory card as illustrated in FIG. 3, then interface 50 might comprise a flash card socket and controller as described above. As another example, if device 22 is a PDA with an infrared port, then interface 50 might comprise a corresponding infrared port and controller arranged to communicate data via infrared signals. As still another example, if device 22 includes an RF wireless transceiver, such as a transceiver conforming to the Bluetooth™ specification, then interface 50 could similarly include a wireless transceiver arranged to communicate data via RF signals. Interface 50 could take still other forms as well.

Data store 44 may hold two data components: (i) geographic data 54 and (ii) program logic 56. Geographic data 54 can take various forms. For example, geographic data 54 can comprise one or more databases of geographical data each corresponding, respectively, to one or more geographical areas or types of information. However, in an exemplary embodiment, geographic data 54 preferably contains only a portion of each database of geographic data that is, by itself, not usefully accessible by a navigation system.

In this regard, a database or other such data product can include a set of critical information (critical data) that permits the entire data product to be used. The critical information could take various forms. For instance, the critical information could include a number of indexes, pointers or global parameters that enable a machine (such as a computer processor) to access the data product. As an example, for instance, a database may define a number of records or other parcels of information, and the critical information in the database may define pointers to where in the database the records or other parcels begin. As another example, the useful data in a database may be compressed or encrypted using various algorithms and parameters, and the critical information may serve as a key to the data by specifying the parameters or algorithms that a machine should use in order to decompress or decrypt the data. As yet another example, a number of records in a database may include a code representative of a useful data value, and the critical information in the database may define (or point to) the corresponding data value. Without access to the critical information, a machine may therefore be unable to access the useful data in the database.

The critical information in a database may be stored in one block in the database or may, alternatively, be distributed throughout the database. As an example, the information may be stored in a header or other block at the beginning of the database. As another example, the information may comprise a number of indexes and other general parameters disposed at the beginning of each of a number of parcels throughout the database. Typically, the critical information will comprise a relatively small portion of the database.

Figure 6:
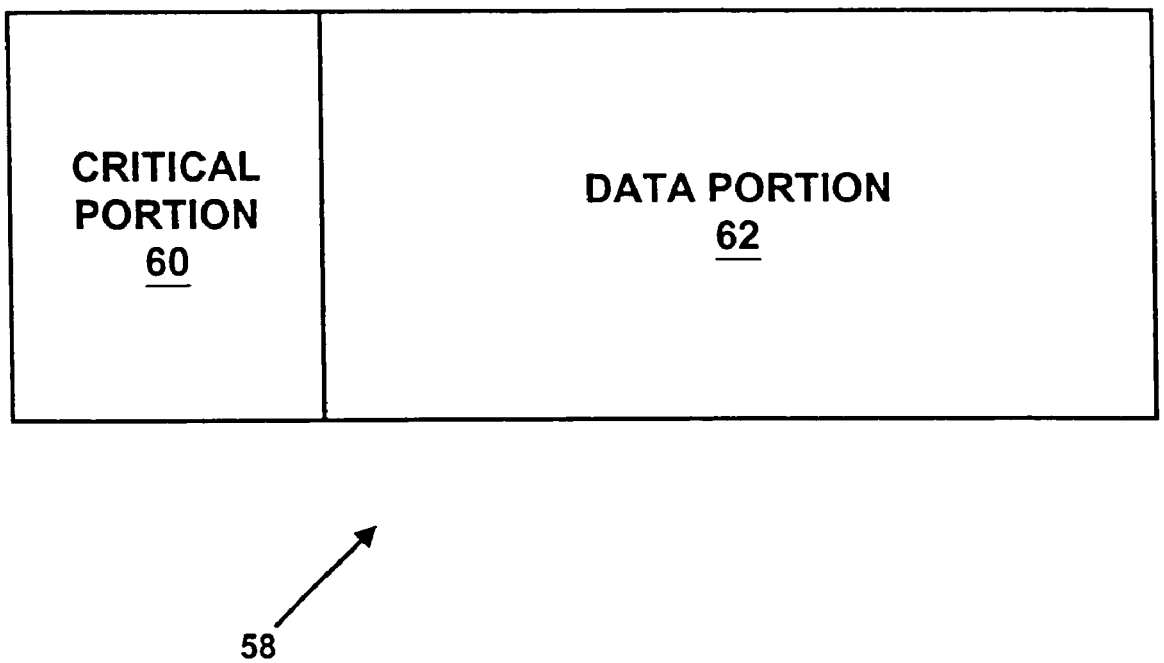
FIG. 6 is a database having a critical portion and a data portion.

To illustrate, FIG. 6 depicts a database 58 that has a critical portion 60 and a data portion 62. Although FIG. 6 shows these portions as discrete blocks, the two may be interspersed with each other or arranged differently in the actual database. In general, the critical portion 60 contains some or all of the critical information that serves as a key to facilitate access to data in the data portion 62.

In an exemplary embodiment, the geographic data 54 contained in the data store 44 of the terminal 20 excludes some or all of the critical portion 60 of each database product. In one embodiment, the geographic data 54 contained in the terminal 20 excludes an arbitrary-sized portion of each database product. The excluded arbitrary-sized portion corresponds to some or all the critical portion of each database product. In one embodiment, the arbitrary-sized portion corresponds to the first two kilobytes of the database product. Alternatively, the first two kilobytes might not correspond exactly to the critical information portion of a geographic database product. For example, the first two kilobytes may not include all the critical information of the database product or may include all the critical information as well as some of the data portion of the database product. However, by excluding the first two kilobytes of each database, enough of the critical portion is excluded so as to render the remainder unusable. In alternative embodiments, the arbitrary-sized portion may correspond to sizes other than two kilobytes or parts of the database product of than the first part.

The geographic data 54 stored at the terminal 20 may include just the remaining portions of each database product with the arbitrary-sized portions excluded. Alternatively, the geographic data 54 stored at the terminal 20 may include entire database products with the portions corresponding to the arbitrary-sized excluded portions replaced with random or otherwise useless data.

In turn, the geographic data 36 in the data store 28 of the authorization server 12 preferably includes at least the arbitrary-sized portions of each database that are not stored at the terminals 22. In this regard, the geographic data 36 maintained by the authorization server may comprise the entire databases of geographic information, and the authorization server may be programmed to parse the arbitrary-sized portions from a given database for transmission to a terminal 20 upon authorization. Alternatively, in an exemplary embodiment, the authorization server may regularly maintain the critical portion of each database as a discrete data block ready to send to a terminal upon authorization.

Advantageously, with this arrangement, a person or other entity with access to data stored in terminal 20 can be prevented from using the databases without proper authorization, and namely without access to the actual critical portions of the databases. At the same time, however, terminal 20 can readily obtain the necessary critical information from authorization server 12 when appropriate and can record both the critical portion 60 and the data portion 62 on storage device 22 for use by navigation system 16.

Authorization server 12 may provide geographic data 54 via link 18 to each data terminal 20 periodically, upon request, or in response to other designated stimuli. Authorization server 12 may, for example, send geographic data 54 to data terminal 20 via link 18 in off-hours, such as overnight for instance. This way, if link 18 has limited bandwidth (e.g., if link 18 is the public switched telephone network, and authorization server 12 and terminal 20 communicate with each other over link 18 via a 56 kbps modem connection, or if link 18 comprises a network such as the Internet that tends to be congested during normal daytime hours, for instance), geographic data 54 can be conveyed with little if any concern.

Alternatively, geographic data 54 could be provided to data terminal 20 in some other manner. For example, geographic data 54 could be loaded onto a CD ROM, which can be physically sent to data terminal 20. A technician can then insert the CD ROM into a suitable CD ROM drive in the data terminal or an arrangement could be in place to read the data from the CD ROM into data store 44.

Program logic 56 may comprise a number of machine language instructions that define routines executable by processor 42. In operation, these instructions can be loaded from data store 44 into memory 46 and then executed by processor 42 to carry out various functions such as interfacing with a user via display 52 and sending data to interface 50, to be written to portable data storage device 22. Program logic 56 also includes an operating system (not shown), such as Unix, Linux® or Microsoft Windows®, for instance.

Data terminal 20 preferably has a unique terminal ID. This ID could be a network address of the terminal or could be a more permanent terminal identifier. In the exemplary embodiment, the terminal ID could be stored permanently in ROM or in another suitable manner.

Figure 7:
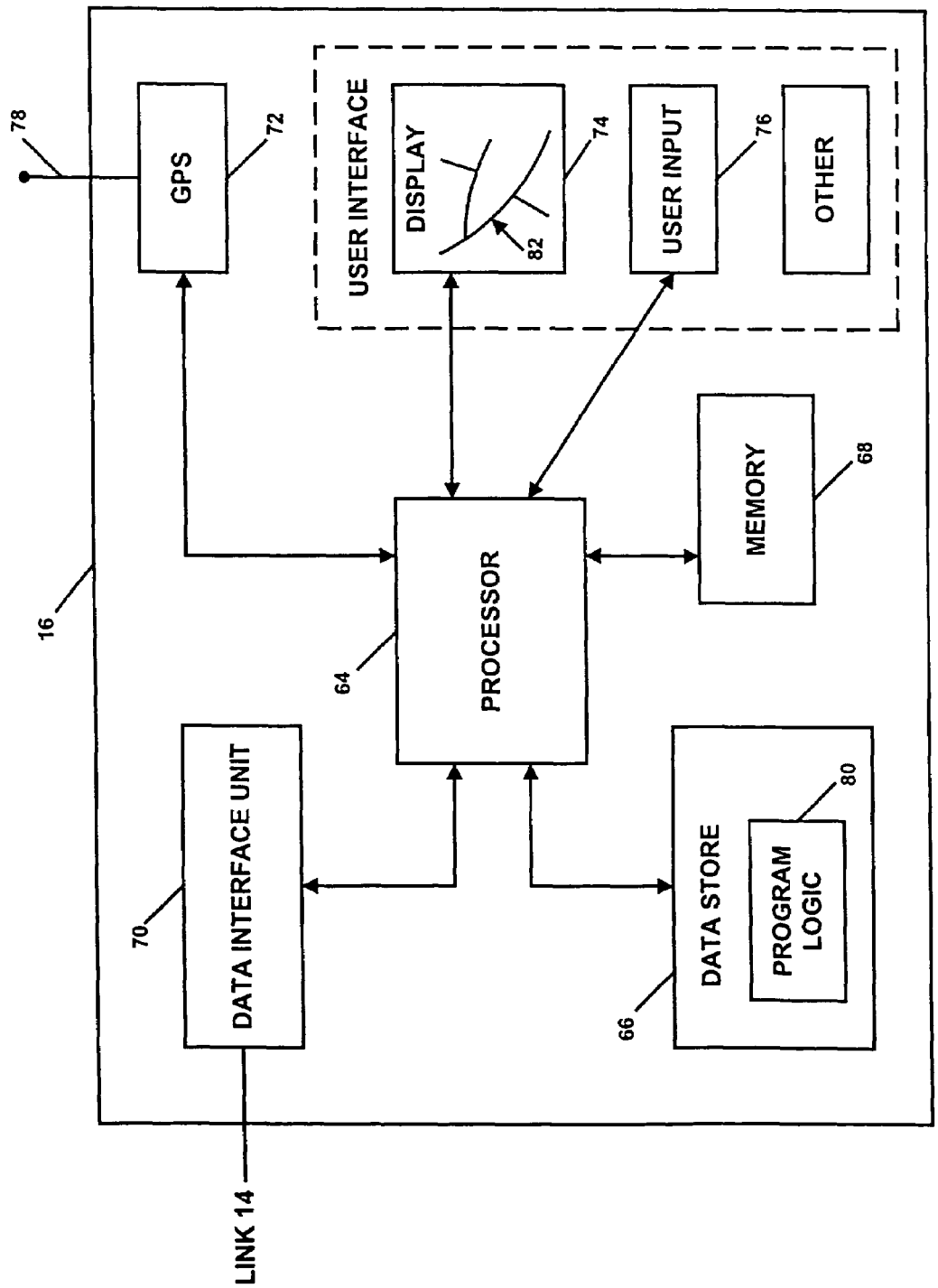
FIG. 7 is a block diagram of an exemplary navigation system.

Referring now to FIG. 7, an exemplary navigation system 16 is illustrated in greater detail. Exemplary navigation system 16 could be an in-vehicle navigation system or could reside in a handheld (i.e., portable) device or other entity, such as a cellular telephone, PDA, pager, computer or dedicated mapping or positioning device, for instance. Other examples are possible as well.

In an exemplary embodiment, navigation system 16 includes a processor 64, a data store 66, a memory 68, a data interface unit 70, a positioning system 72, a display 74, and a user input mechanism 76. These components may be coupled together by a bus or other communications path. And the components can take various forms. By way of example, processor 64 may be an Intel Pentium III microprocessor, data store 66 may be a flash memory, ROM and/or magnetic or optical hard disk drive, memory 68 may be volatile RAM, data interface unit 70 may be any interface suitable for facilitating communications with distribution medium 22, display 74 may be an LCD display and/or other means (audible or visual) for presentation, and user input mechanism 76 may be a keyboard, control knob or microphone, for instance.

In the exemplary embodiment, positioning system 72 outputs information about the position of the navigation system (e.g., the position of a vehicle in which the system is located, or the position of a person carrying the system, for instance). This information may be in terms of latitude and longitude, distance and heading, or other suitable parameters. Positioning system 72 may comprise a GPS receiver, the arrangement and operation of which are well known to those skilled in the art. Alternatively, positioning system 72 can take other forms. Positioning system 72 also preferably includes an antenna 78 or other such device for receiving GPS positioning signals from satellites or for receiving position information from other types of entities.

Data store 66 may hold navigation program logic 80, which may comprise a number of machine language instructions that can be loaded into memory 68 and executed by processor 64 to perform various functions, such as decrypting and validating data, and providing navigation services, for instance. Data store 66 also holds an operating system (not shown), such as Unix, Linux® or Microsoft Windows CE®, for instance, which can also be loaded into memory 68 and executed by processor 64. Program logic also includes a data access library used to access data libraries such as SDAL, as described for instance in U.S. Pat. No. 6,047,280 (the '280 patent), the entirety of which is hereby incorporated by reference.

Although not shown in FIG. 7, data store 66 can also hold other information, such as geographic data for instance. In that event, navigation system 16 could obtain geographic data via data interface unit 70 and store the geographic data in data store 66 or memory 68. This geographic data may, for instance, be the data portion 62 of one or more geographic databases, as shown in FIG. 6 and described above. With this arrangement, the navigation system would not be able to usefully access the geographic data of a given database until the navigation system obtains the critical portion 60 of the database as well. In the exemplary embodiment, however, geographic data is primarily maintained on portable data storage device 22 and is read by processor 64 into memory 68 from device 22.

In the exemplary embodiment, as noted above, data interface unit 70 serves to facilitate communication with portable data storage device 22. Therefore, data interface unit 70 preferably includes a port for communicating with storage device 22. Similar to the interface 32 of the authorization server and interface 50 of terminal 20, the arrangement and operation of data interface unit 70 may depend on the arrangement and operation of portable data storage device 22. Thus, data interface unit 70 might comprise a flash card socket, an infrared port, and/or an RF transceiver, for example.

Some or all of the components of navigation system 16 are preferably located in positions where they are readily accessible to a user for whom navigation services are to be provided. For example, if navigation system 16 is an in-vehicle navigation system, display 74 and user input mechanism 76 may be integrated in the vehicle dashboard for easy access by a driver, and the other components of the system can be hidden behind the dashboard or in another suitable location.

Data interface unit 70 may also be provided in the vehicle dashboard or could be hidden from view, depending on how the data interface unit 70 is arranged to communicate data. For example, if data interface unit 70 is arranged to communicate with portable data storage device 22 via an electrical connection, then data interface unit 70, or at least an electrical connection to the unit, will preferably be exposed to facilitate user access. For instance, data interface unit 70 could be arranged as a socket or slot within the vehicle dashboard, into which a flash card could be inserted, similar to the socket described above On the other hand, if data interface unit 70 is arranged to communicate with portable data storage device 22 via a wireless link, for instance, then unit 70 could be hidden from the user.

Similarly, if navigation system 16 is provided in a handheld device, such as a PDA, a cellular telephone or a dedicated positioning device, for instance, some of the components can be provided on the exterior surface of the device so as to facilitate user interaction, and other components can be hidden within the device. For example, on a PDA, a touch-sensitive display could serve as both display 74 and user input mechanism 76, and an expansion port or other link (e.g., an infrared port or antenna) could serve as the data interface unit 70. Other components of the navigation system can then be incorporated internally with the normal components of the PDA.

In an exemplary embodiment, navigation system program logic 80 uses the output of positioning system 72, in combination with geographic data 108 stored on the portable storage device 22, to provide navigation services, features and information to a user of the navigation system. Using output from the positioning system 72 and geographic data 108, program logic 80 preferably provides a map 82, a direction indicator (e.g., a turn arrow) and/or other information on display 74. A map 82, for instance, may illustrate the location of the navigation system in a given geographical area. Program logic 80 may provide information about what points of interest are available, distances to various points of interest, directions (visual and/or audible) to a desired destination, such as a street address or point of interest, and so forth. User input mechanism 76, which may comprise a control knob, keyboard, or microphone, for instance, allows a user to specify a desired destination, in response to which program logic may generate and display directions to the destination.

Navigation system 16 will likely have a specific make (vendor) and model number. Additionally, navigation system 16 preferably has a unique navigation system ID, such as a serial number or other code. In addition to uniquely identifying the navigation system, the navigation system ID may also be indicative of the navigation system make and model. In an exemplary embodiment, the navigation system ID) is stored permanently in the navigation system, such as in ROM for instance.

Navigation systems as described above can be manufactured and assembled and then sold, rented or otherwise distributed to consumers through any suitable distribution channels. For example, in-vehicle navigation systems can be sold or rented by car dealerships as optional or standard equipment in vehicles. As another example, retail stores may sell dedicated GPS-based navigation devices to users. As still another example, vendors may sell or otherwise provide software navigation systems that use geographic data to generate maps and directions, even without including or using positioning systems. Such navigation applications can be executed by a computer that has functional elements similar to those of navigation system 16, for instance.

When a user obtains navigation system 16, the user may also obtain a navigation system ID card, which identifies the navigation system by its model number and navigation system ID. The information on the card may be machine readable, such as via a magnetic strip or RF tag for instance. The user may also obtain a user ID card or other indication of a user ID, which uniquely identifies the user. The user ID card may similarly indicate the user ID in machine readable form.

B. Exemplary Provisioning of Geographic Data

In order for navigation system 16 to provide navigation services, it should have access to a database or other set of geographic data. With the exemplary embodiment as described above, a database of geographic data can be provided to navigation system 16 on portable data storage device 22. Therefore, according to the exemplary embodiment, when a user first obtains navigation system 16, the user preferably also obtains a portable storage device 22, suitable for containing geographic data. The user may obtain the data storage device 22 from the same entity that provided the user with the navigation system 16.

For instance, when a user obtains a car that has a navigation system installed as standard equipment, the car may come with a portable data storage device 22 as well. As another example, when a user buys a navigation system at a retail outlet, the system may also include a portable data storage device 22. Alternatively, the user may purchase the portable data storage device separately or obtain the device at some other time or in some other way.

When the user first obtains the portable data storage device 22, the storage device might come pre-loaded with geographic data for a specific geographical area (such as a city, state or other region, for instance). In that event, however, the user may at some point wish to update the set of geographic data on device 22 so as to have the data reflect more current road conditions and points-of-interest. Alternatively, the user may at some point wish to replace the geographic data on the storage device with geographic data for a different geographical area. Still alternatively, storage device 22 may not contain any geographic data to start. In that event, the user may wish to load a set of geographic data onto the storage device to facilitate operation of the user's navigation system in a given geographic area.

Figure 8:
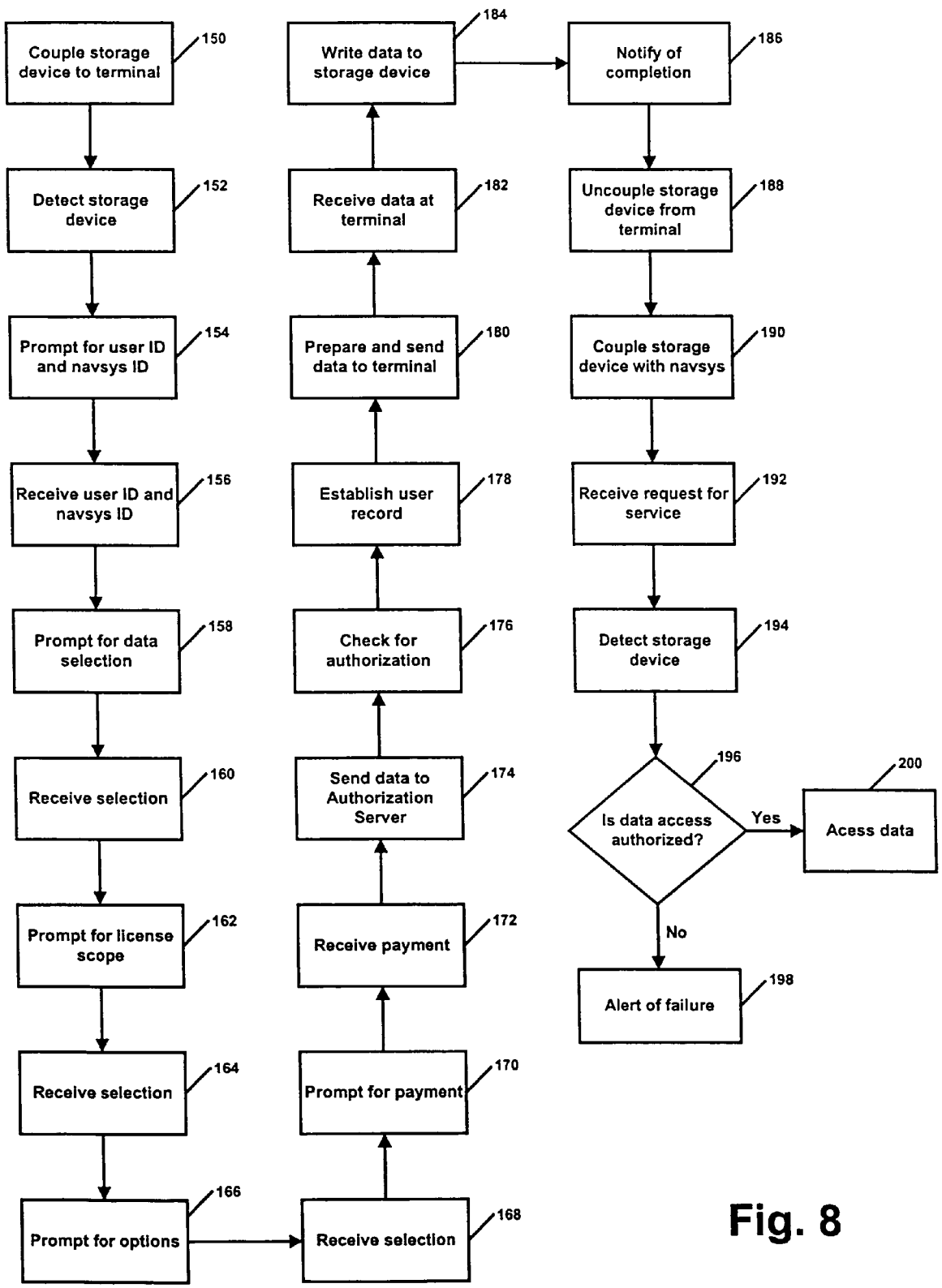
FIG. 8 is a flow chart depicting an exemplary process that may be performed in order to provide a database of geographic data to portable data storage device.

Various processes may be employed in order to load a geographic database onto portable storage device 22. As indicated above, for example, authorization server 12 can send some or all of the database to intermediate terminal 20, and terminal 20 can then record the database onto storage device 22. FIG. 8 is a flow chart depicting an exemplary process that may be performed in order to provide a database of geographic data to portable data storage device 22 in this way, and in turn to provide the data for use by a navigation system 16.

As shown in FIG. 8, at block 150, a user first couples storage device 22 with the interface 50 of terminal 20. For example, if storage device 22 is a flash card, the user may insert the card into a corresponding flash card socket at terminal 20. At block 152, terminal 20 detects the presence of storage device 22 and reads the storage device ID from the permanent storage portion of storage device 22. In this example, terminal 20 may also attempt to read geographic data from the storage device and determine that the storage device does not yet contain geographic data.

At block 154, terminal 20 then preferably prompts the user to input the user's ID (and perhaps a personal identification number (PIN)) and the navigation system ID in connection with which the user will want to use the geographic data. At block 156, the user supplies this information. As indicated above, the navigation system ID and user ID can be encoded in machine readable form on one or more ID cards. Terminal 20 may include means for reading those cards and obtaining the user and system IDs. Alternatively, for instance, the user could type or otherwise enter the user ID and navigation system ID into the data terminal.

At block 158, terminal 20 may then prompt the user to select from a menu of geographical regions for which geographic data can be loaded onto device 22. The menu may, for instance, list all of the regions for which data store 44 of terminal 20 currently contains geographic data. (As noted above, in an exemplary embodiment, data store 44 may contain geographic data in the form of only the data portions 62 of various geographic databases. Each data portion maintained by terminal 20 could be labeled or otherwise cross-referenced to correspond with a particular geographical region.)

At block 160, the user may then select a desired region (or multiple regions). At block 162, terminal 20 may then responsively prompt the user to indicate whether the user wishes to (i) purchase the data or (ii) rent the data for a certain period of time or for a certain number of uses. At block 164, the user may respond by selecting either "purchase" or "rent" with specified time or uses for instance.

At block 166, terminal 20 may also prompt the user to select from a number of special geographic data options. These options may take various forms. For instance, an option might be for the user to be able to access Fodor's® Restaurant Guide and/or special geographic areas on navigation system 16. Each option might have a corresponding option number. And terminal 20 may also prompt the user to select a desired period of use or number of uses for a given option. At block 168, the user may respond to the terminal by selecting one or more options and criteria for use.

At block 170, terminal 20 may then prompt the user to supply payment information, such as a credit or debit card number for instance. And at block 172, the user may provide the requested payment information. In an exemplary embodiment, the dealer that sold the user the navigation system 16 and/or the storage device 22 may have provided the user with a pre-payment code, which the user may supply to terminal 20 to satisfy payment. The dealer could then be ultimately accountable for the payment.

At block 174, terminal 20 then sends via link 18 to authorization server 12 a set of information preferably including (i) the user ID, (ii) the storage device ID, (iii) the navigation system ID, (iv) the selected geographic region (which might be the database name, for instance), (v) rental time period or times of use, if applicable, (vi) options and periods or numbers of use of options, (vii) the terminal ID, and (viii) the payment information. Authorization server 12, in turn, receives this set of information.

At block 176, authorization server 12 queries its authorization database 40 to determine whether the user is already authorized to receive the requested geographic data to be stored on the specified storage device and accessed by the specified navigation system. This query may be keyed to the user ID provided from terminal 20 for instance. This example will assume that a user record does not yet exist in authorization database 40.

In addition, if the user has provided a PIN in connection with the user ID, the authorization server may verify that the PIN is correct, by reference to a PIN table in the authorization database 40. In the event the PIN is not correct, the authorization server may return a signal to the data terminal, indicating that the session cannot continue absent a correct PIN.

At block 178, finding no corresponding user record, authorization server 12 establishes a user record indicating that, for the user having the user ID, the storage device having the storage device ID is authorized to hold a particular database of geographic data, and the navigation system having the navigation system ID is authorized to access the particular database of geographic data. Further, to the extent the user elected to rent the data for only a specific time period or for a number of uses, authorization server 12 may record in the user record an expiration date or a count of number of allowed uses. At block 180, authorization server 12 may then prepare and send data to terminal 20, to be written to storage device 22.

Authorization server 12 can send to terminal 20 the entire database of geographic data corresponding to the region selected by the user. (This database may be referred to as the "selected database.") However, in the exemplary embodiment, terminal 20 is assumed to already have the data portion 62 of the database stored in its data store 44. Therefore, conveniently, authorization server 12 will preferably send only the critical portion 60 of the database to terminal 20. Advantageously, this will take far less time than it would take for the authorization server to send the entire database to terminal 20.

When the critical portion 60 is combined with the data portion 62 of the database that is stored in data store 44 of terminal 20 and the combination is provided to a system such as navigation system 16, the system should be able to use the critical portion as a key to access the data in the database. However, as noted above, the exemplary embodiment seeks to avoid some of the risks associated with releasing valuable information such as geographic data. Therefore, rather than simply sending the critical portion (or the entire database, if desired) to terminal 20, authorization server 12 preferably first encrypts and/or otherwise secures the critical portion (or entire database), producing a set of secure data, so as to avoid unauthorized use of the database. Details of how this process may work in practice will be provided below.

At block 182, terminal 20 receives the secure data sent from authorization server 12. At block 184, terminal 20 then writes to portable data storage device 22 (i) the data portion of the database, which terminal 20 maintained in its data store 44, and (ii) the secure data that terminal 20 received from authorization server 12. As a result, at this point, data storage device 20 contains a secure copy of the selected database.

At block 186, terminal 20 then informs the user that storage device 22 is ready for use. Therefore, at block 188, the user removes the storage device from communication with terminal 20 and, at block 190, the user communicatively couples the storage device with navigation system 16. For example, if storage device 22 is a flash card, the user may insert the device into a corresponding flash card socket of navigation system 16. As another example, if storage device 22 has a Bluetooth™ RF interface, the user may bring device 22 within an appropriate range of navigation system 16 so as to couple device 22 with a corresponding data interface unit 70 of the navigation system.

At block 192, navigation system 16 is then powered up or receives a request to provide navigation services. For example, the user may engage user interface mechanism 76 in order to instruct the navigation system that the user wants to travel to a specified destination address or point of interest. In response, the navigation system would ordinarily retrieve geographic data from data storage device 22 and use that data in combination with positioning information provided by positioning system 72 to generate map 82 showing the user how to get to the specified destination.

In the exemplary embodiment, at block 194, navigation system 16 may detect the presence of device 22. In turn, at block 196, navigation system 16 may responsively seek to access the database on the storage device. To do so, navigation system 16 preferably performs a process to validate and/or facilitate access to the database. This process will depend on the process used to secure the database. The process may be predetermined and/or may be identified by a message stored on storage device 22 together with the set of secure data. Details of how this process may work in practice will be provided below as well.

At block 198, assuming that the navigation system is precluded from accessing the geographic data stored on device 22, the navigation system may audibly and/or visually alert the user that navigation services are unavailable. In doing so, the navigation system may present on display 74 the reasons for refusal of service. Further, in an exemplary embodiment, possibly depending on the reasons for denial of service, the navigation system may send a message to a central office to report the failed attempt. The navigation system may, for instance, send the message over a wireless telecommunications network as an industry standard short message service (SMS) message or in another manner.

Alternatively, at block 200, assuming that the navigation system can properly and successfully access the geographic data stored on device 22, the navigation system will do so. The system may then use the geographic data to provide the navigation services requested by the user.

C. Exemplary Securing of Data and Secure Communication of Data

As noted above, the process of securing the data, and securely communicating the data, can take various forms. Generally speaking, by way of example, the process may involve (i) encrypting the critical portion 60 so as to establish an encrypted critical portion that can be decrypted using a decryption key, (ii) establishing a set of authorization parameters useful for validating and/or facilitating access to the database, and (iii) tying the authorization parameters to the encrypted critical portion. At the receiving end, such as a navigation system 16, the process may then involve (iv) using the authorization parameters to validate and/or facilitate access to the database, (v) using the decryption key to decrypt the encrypted critical portion, and then (vi) using the critical portion to facilitate access to the data portion of the database. This process may facilitate securing the data, while allowing the data to be used in connection with one or more authorized entities (such being stored on a given data storage medium, or being used by a given navigation system, for instance). FIGS. 9, 10, 11 and 12 are flow charts showing specific examples of how this process may work in practice.

Figure 9:
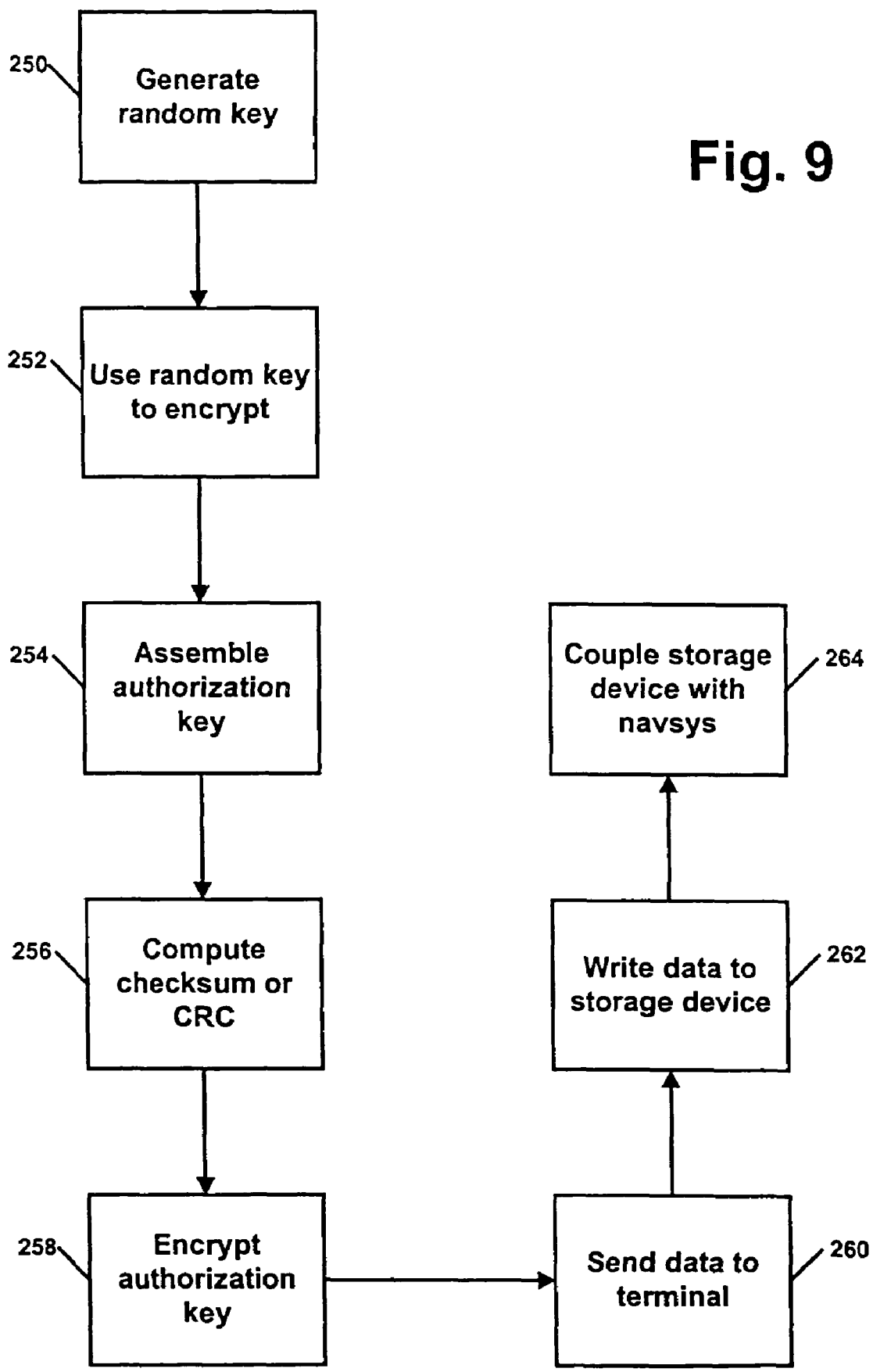
FIG. 9 is a flow chart depicting a set of functional blocks that may be involved in securing and providing data to a navigation system in accordance with an exemplary embodiment.

FIG. 9 illustrates a set of functional blocks that may be involved in securing and providing data to a navigation system in accordance with an exemplary embodiment of the invention. As shown in FIG. 9, at block 250, the authorization server generates a random key (e.g., bit string) to be associated with the selected database. (As understood in the art, it may be impossible to generate a truly "random" key. However, techniques are well known for generating substantially random data, and those techniques may be employed here. In this regard, the term "random" may be equated with the term "substantially random.") At block 252, the authorization server then uses the random key to symmetrically encrypt the critical portion 60 of the database, so as to produce an encrypted critical portion that can be decrypted using the random key.

Methods of symmetric encryption are very well known in the art and others may be developed in the future as well. Examples of suitable symmetric encryption methods include the Advanced Encryption Standard (AES) and "Two Fish" by Bruce Schneier. Similarly, other suitable methods of encryption, such as public key/private key encryption are also well known in the art. Examples of such methods include elliptical curve cryptography, pretty-good-privacy (PGP) and RSA. These and other encryption methods are well known to those skilled in the art and are described, for instance, in Schneier, B., "Applied Cryptography—Protocols, Algorithms, and Source Code in C," Chapters 11-14, 18-19 and 24 (2d ed., John Wiley & Sons, Inc. 1996), and Schneier, B. et al., "Twofish: A 128-Bit Block Cipher," http://www.counterpane.com/twofish.html (Jun. 15, 1998), both of which are hereby incorporated by reference.

At block 254, the authorization server next assembles a set of authorization parameters and combines the parameters to establish an authorization key that includes verification information useful for validating use of the database. In the exemplary embodiment, these parameters may comprise the following, for instance:

1. SYSTEM INFORMATION. These parameters may include information indicating entities of the system that are authorized to possess and/or access the selected database. These parameters preferably include (i) the navigation system ID and (ii) the data storage ID.
2. DATABASE INFORMATION. These parameters define information about the specific database that is being provided. For instance, this information may include (i) the database name, which may be indicated by a field in the database, (ii) a unique serial number, which the authorization server has inserted into the critical portion to identify the copy of the database, (iii) the database version (e.g., revision number) (iv) a randomly generated index into the critical portion, and the 32-bit value stored at that index, and (v) optional database information selected by the user, such as Fodor's® Restaurant Guide, for instance.
3. DATABASE DECRYPTION KEY. This parameter is the decryption key that can be used to decrypt the encrypted critical portion. Given that the authorization server symmetrically encrypted the critical portion with the randomly generated key, this decryption key is the randomly generated key. However, this parameter may vary depending on the type of encryption performed and consequently on the type of decryption required.
4. ACCESS LIMITATIONS. These parameters may include (i) a data range during which the database and/or a specific option is authorized to be used and (ii) a count of the number of times the database and/or option is authorized to be accessed.
5. TRACING INFORMATION. These parameters may define information that can be used by a geographic data provider to trace the source of fraudulent copies of geographic data. These parameters may include, for instance, (i) the user ID, (ii) the navigation system ID, make and model, (iii) the time and date that the authorization key is being generated, and (iv) the data terminal ID.

Alternatively, the parameters may take other forms as well. Authorization server 12 may combine these parameters together in any desired manner to establish the authorization key. For instance, assuming that each parameter can be represented as a character string or bit string, authorization server 12 can concatenate or interleave the character strings or bit strings. At block 256, the authorization server preferably also computes a CRC or checksum of the authorization key and appends or otherwise adds that CRC or checksum to the authorization key. (As used herein, the terms "CRC" and "checksum" can be considered to be equivalent. Further, other types of hash functions could also be considered to be equivalent as well.)

At block 258, the authorization server then encrypts the authorization key so as to produce an encrypted authorization key that can be decrypted with a particular decryption key. As noted above, each model of a navigation system preferably has its own private/public key pair, and the encryption key to be used for the given model is preferably stored in the authorization server authorization database 40. (As further noted above, the authorization server may encrypt using the private key, allowing the navigation system to decrypt using the public key. Alternatively, the authorization server may encrypt using the public key, allowing the navigation system to decrypt using the private key.) Thus, given the navigation system ID (which may define or cross-reference to a navigation system model number, for instance), the authorization server may retrieve the applicable encryption key from authorization database 40 and may use that encryption key to encrypt the authorization key.

At block 260, the authorization server then preferably sends to terminal 20 via link 18 (i) the encrypted critical portion of the database and (ii) the encrypted authorization key. At block 262, as described above, terminal 20 may then record the encrypted critical portion, the encrypted authorization key, and the data portion 62 onto data storage device 22. And, at block 264, a user may couple device 22 with navigation system 16.

Figure 10:
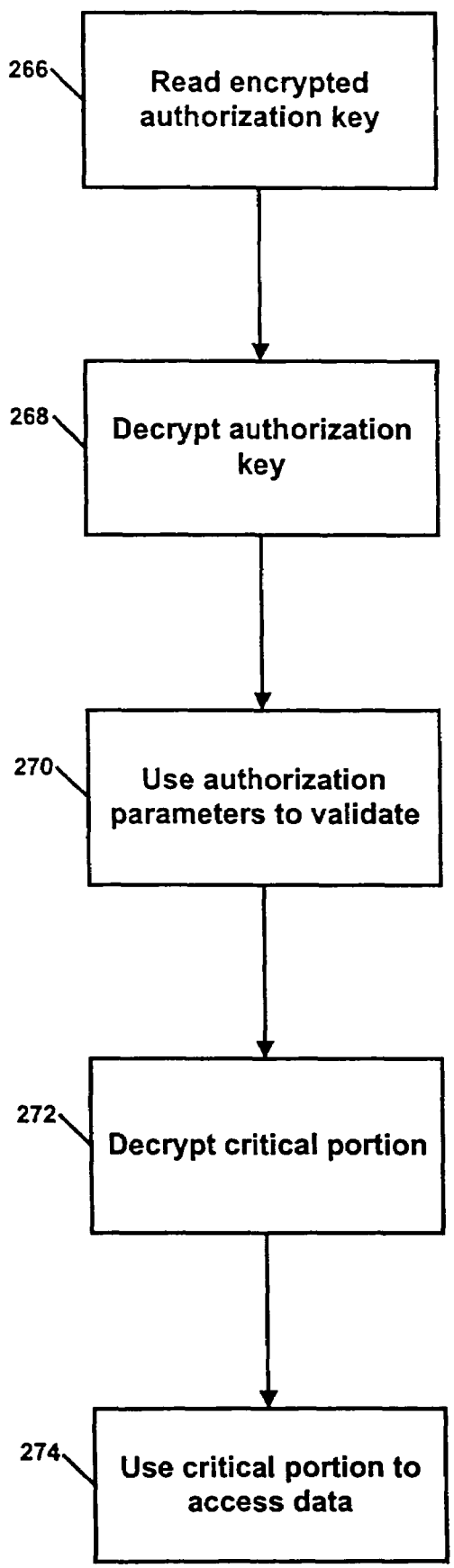
FIG. 10 is a flow chart depicting a set of functional blocks that may be involved in retrieval, decryption and validation of the data at the navigation system in accordance with an exemplary embodiment.

FIG. 10 next illustrates a set of functional blocks that may be involved in retrieval, decryption and validation of the data at the navigation system. The functions performed in these blocks may be performed in the interface layer software described in the '280 patent, for instance, and, more particularly, in the media device isolation layer described therein. Referring to FIG. 10, at block 266, navigation system 16 may first read the encrypted authorization key from device 22. At block 268, the navigation system will then apply its designated decryption key to decrypt the encrypted authorization key so as to produce a plaintext authorization key. In the exemplary embodiment, if the user tries to use the database in connection with a navigation system that is not the model corresponding to the navigation system ID that the user provided, the navigation system will not have the correct decryption key and therefore will not be able to access the data.

At block 270, assuming successful decryption of the encrypted authorization key, the navigation system may then use some or all of the authorization parameters to validate (i.e., establish authority to use) the database. By way of example, the navigation system may read the storage device ID from the permanent memory of storage device 22 and may determine whether that storage device ID matches the storage device ID provided in the authorization key. If the storage device ID does not match, the navigation system may conclude that the storage device contains an unauthorized copy of the database, and the navigation system may therefore refuse to access the database.

As another example, the navigation system may determine whether its own navigation system ID matches the navigation system ID provided in the authorization key. If the navigation system ID does not match, the navigation system may conclude that it is not authorized to access the database, and the navigation system may therefore refuse to access the database.

As still another example, the navigation system may use the access limitations, such as a rental period or use restriction, to determine whether access is currently authorized. Specifically, for example, the navigation system may determine whether the current date (as provided by the GPS positioning system, for instance) falls within the date range specified in the authorization key and, if the date falls outside the range, may refuse to access the database.

At block 272, with successful validation, the navigation system may then decrypt the encrypted critical portion. In particular, the navigation system may (i) read into memory 68 from the storage device 22 the encrypted critical portion, (ii) retrieve from the authorization key the decryption key required for decryption of the encrypted critical portion, and (ii) use the decryption key to decrypt the encrypted critical portion.

At block 274, the navigation system may then use the information within the critical portion 60 (e.g., decompression information, indexes and pointers) as keys to access the geographic data in the data portion 62. In the exemplary embodiment, the data portion remains stored on data storage device 22, while the decrypted critical portion is stored in the volatile memory 68 of the navigation system 16. As long as storage device 22 remains coupled with navigation system 16, the navigation system may thereby continue to access the database of geographical data so as to provide navigation services. When storage device 22 is removed from communication with navigation system 16 or at another suitable time, the decrypted critical portion is preferably cleared from memory 68, thereby preserving the security of the data portion.

Figure 11:
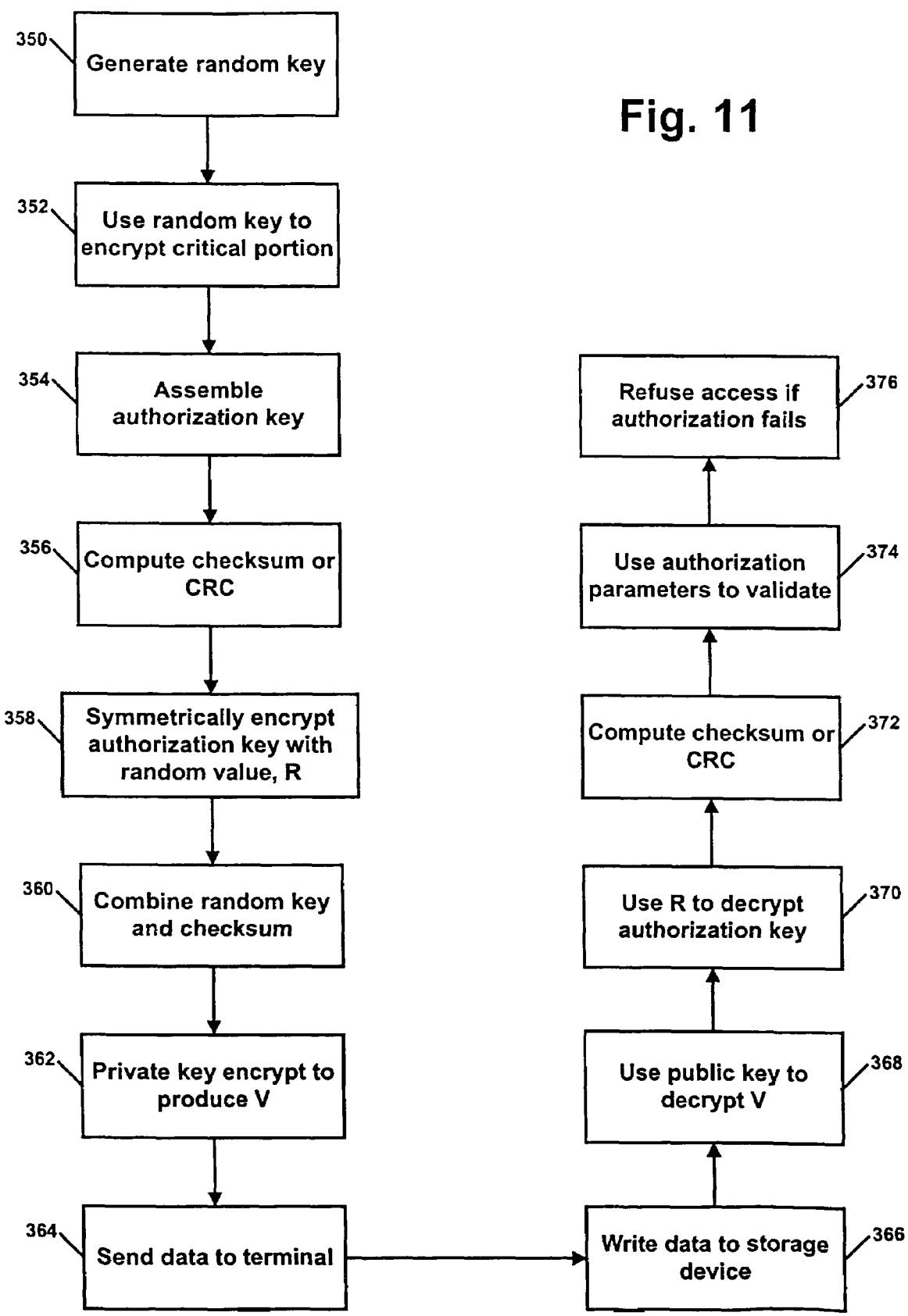
FIG. 11 is a flow chart illustrating a set of functional blocks that may be involved in an enhanced process of securing, conveying and accessing data in accordance with an exemplary embodiment.

While the foregoing provides a robust method of securing geographic data, an alternative process can be employed so as to provide enhanced security. In the alternative process, authorization server 12 can instead symmetrically encrypt the authorization parameters and use public/private key encryption to encrypt only the symmetric key, preferably together with a value representative of the authorization key, rather than to encrypt the entire authorization key. FIG. 11 is a flow chart illustrating a set of functional blocks that may be involved in this alternative process.

As shown in FIG. 11, at block 350, the authorization server generates a random key to be associated with the selected database. At block 352, the authorization server then uses the random key to symmetrically encrypt the critical portion of the database, so as to produce an encrypted critical portion that can be decrypted using the random key.

At block 354, the authorization server then assembles a set of authorization parameters and combines the parameters to establish an authorization key. These parameters may be those described above, for instance, including the random key necessary for decryption of the encrypted critical portion.

At block 356, the authorization server computes a checksum or CRC, C, of the authorization key. At block 358, the authorization server then generates a random value, R, and uses R to symmetrically encrypt the authorization key, rather than public key encrypting the authorization key.

At block 360, the authorization server combines together the values C and R, such as by concatenating or interleaving the values for instance, to produce a value V. At block 362, the authorization server uses the private key (associated with the navigation system model) to encrypt the value V. Finally, at block 364, the authorization server sends to terminal 20 (i) the encrypted value V, (ii) the encrypted authorization key, and (ii) the encrypted critical portion.

Upon receipt of this information, at block 366, terminal 20 then preferably records onto data storage device, (i) the encrypted value V, (ii) the encrypted authorization key, (iii) the encrypted critical portion, and (iv) the unintelligible data portion of the database.

When the navigation system receives data storage device 22 and seeks to access the database, at block 368, the navigation system uses its public key to decrypt the encrypted value V. The navigation system may therefore retrieve values R and C from value V. At block 370, the navigation system then uses value R to symmetrically decrypt the encrypted authorization key. At block 372, the navigation system then computes the checksum or CRC of the authorization key and compares the resulting value with value C. If value C matches, then, at block 374, the navigation system proceeds to use the authorization parameters to validate use of the database as described above. Alternatively, if value C does not match, then, at block 376, the navigation system may refuse to access the geographic database.

Figure 12:
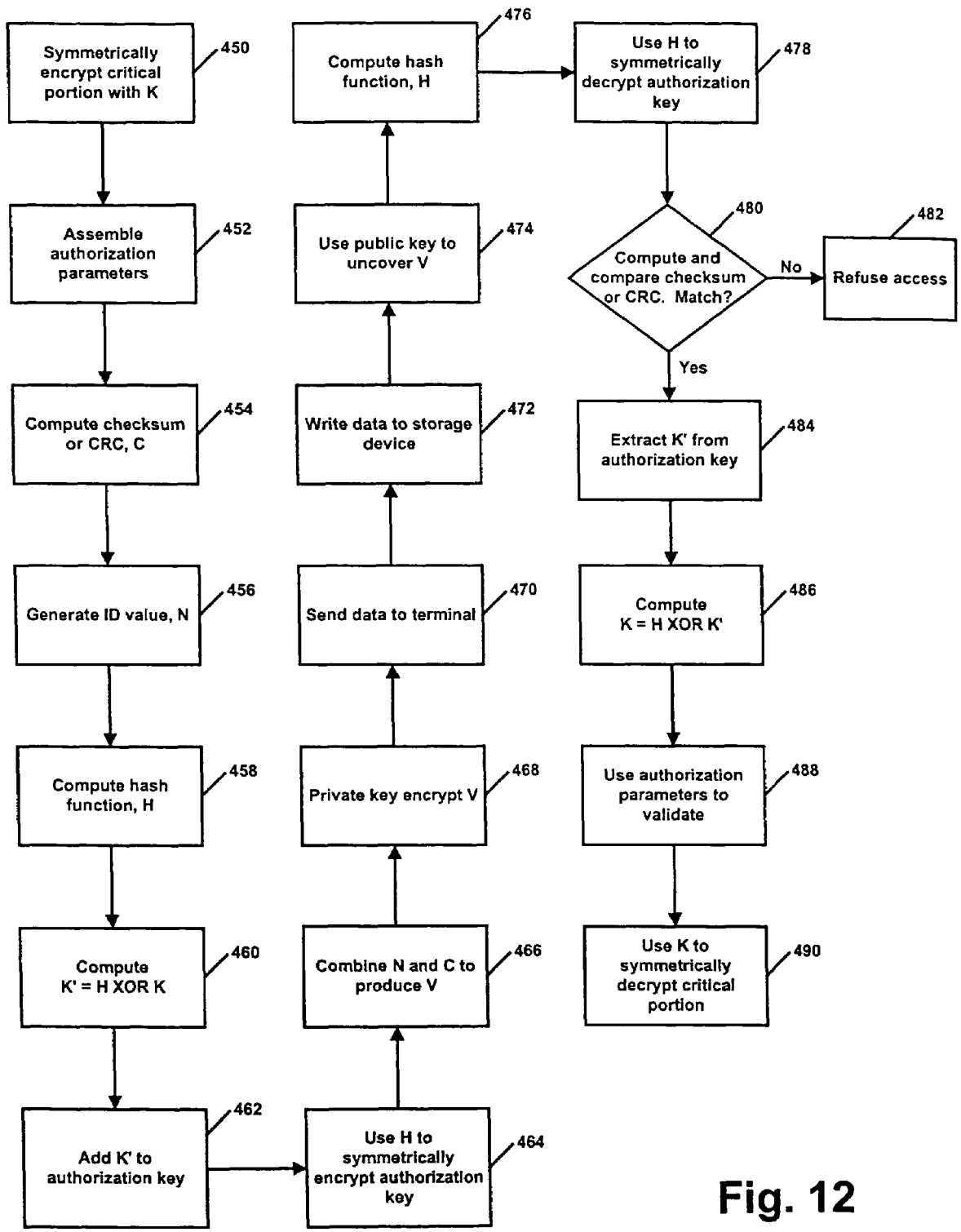
FIG. 12 is a flow chart illustrating a set of functional blocks that may be involved in another enhanced process of securing, conveying and accessing data in accordance with an exemplary embodiment.

In yet another exemplary embodiment, the process of securing geographic data can be still further enhanced. In this further embodiment, the authorization key can be encrypted in such as way that the decryption key required to access the authorization key is itself tied to environmental parameters, such as the authorization parameters and/or contents of the database. FIG. 12 is a flow chart depicting an example of this further enhanced security process.

As shown in FIG. 12, at block 450, the authorization server generates a random value, K, and uses the value K as a key to symmetrically encrypt the critical portion of the database, so as to produce an encrypted critical portion that can be decrypted using the value K.

At block 452, the authorization server then assembles a set of authorization parameters and combines the parameters to establish an authorization key. These parameters may be the same as those described above, except that the parameters preferably exclude the navigation system ID and the storage device ID. The navigation system ID and storage device ID will instead be used in the process of producing a symmetric key for encrypting the authorization key. Further, the parameters preferably do not yet include the value K required for decryption of the encrypted critical portion of the database. Still further, the parameters may exclude the database version information and other such information (since, as will be noted below, other intrinsic information about the database (e.g., bytes of the database) may be incorporated in the securing process instead).

At block 454, the authorization server calculates a checksum or CRC, C, of the authorization key. At block 456, the authorization server may then generate an ID value, N, which the authorization server may record in its data store 28 as a key to a database record indicative of environmental parameters such as the user, the navigation system and the storage device for instance.

Next, at block 458, the authorization server computes a one-way hash function or other function to generate an output value H. The hash function is preferably based on the authorization key. In particular, for instance, the inputs to the hash function are preferably values that should be accessible by both the machine generating the authorization key (i.e., authorization server 12) and the machine that will decrypt the authorization key (i.e., navigation system 16). In this exemplary embodiment, the inputs to the hash function include environmental parameters, such as (i) the navigation system ID, (ii) the storage device ID, (iii) the ID value N, (iv) the checksum or CRC value C, and (v) a predetermined number of bytes selected from a predetermined location of the encrypted critical portion of the database. Suitable hash functions are well known to those skilled in the art, as described, for instance, in Schneier, B., "Applied Cryptography—Protocols, Algorithms, and Source Code in C," Chapters 11-14, 18-19 and 24 (2d ed., John Wiley & Sons, Inc. 1996).

At block 460, the authorization server may then XOR or otherwise combine the output value H with the random value K that was used to symmetrically encrypt the critical portion of the database, and the authorization server may thereby produce a value K'. At block 462, the authorization server may then append or otherwise add the value K' to the authorization key. This way, a machine seeking to access the database will be forced to first establish the value H and then XOR the value H with the value K', so as to recover the value K for use in decrypting the encrypted critical portion. Therefore, the machine seeking access to the data will need to have access to the parameters that were used to establish the value H (such as navigation system ID and storage device ID, for instance) in order for the machine to effectively have access to the decryption key K, in order to facilitate decryption of the critical portion and, in turn, in order to facilitate access to the database.

At block 464, the authorization server preferably uses the value H as a symmetric key to encrypt the authorization key, so as to produce an encrypted authorization key that can be decrypted using the value H. Again, because the value H stems from certain environmental parameters such as the navigation system ID and storage device ID, for instance, a machine seeking access to the database will need to know these parameters in order to facilitate access to the database, thereby providing added security.

At block 466, the authorization server may next combine together the ID value N with the checksum or CRC value C, such as by concatenating or interleaving the values for instance, to produce a value V. At block 468, the authorization server then uses the private key (associated with the navigation system model) to encrypt the value V. Finally, at block 470, the authorization server sends to terminal 20 (i) the encrypted value V, (ii) the encrypted authorization key, and (ii) the encrypted critical portion.

Upon receipt of this information, at block 472, terminal 20 then preferably records onto data storage device, (i) the encrypted value V, (ii) the encrypted authorization key, (iii) the encrypted critical portion, and (iv) the unintelligible data portion of the database.

When the navigation system receives data storage device 22 and seeks to access the database, at block 474, the navigation system uses its public key to decrypt the encrypted value V. The navigation system may therefore retrieve values N and C from value V.

At block 476, the navigation system then computes the same hash function that the authorization server computed, with the same inputs used by the authorization server. In the exemplary embodiment, therefore, if navigation system does not have access to the environmental parameters, such as the navigation system ID and storage device ID, the navigation system will not be able to successfully compute the same value H that the authorization server computed, and the navigation system may be precluded from accessing the database. Similarly, if the navigation system does not have the required public key and is therefore unable to decrypt encrypted value V at block 474, it will not be able to uncover values N and C and, consequently, it will not be able to compute the hash function. However, if the navigation system has access to, and uses, the appropriate inputs, the hash function will produce the value H.

At block 478, the navigation system then uses the computed value H as a symmetric key to decrypt the encrypted authorization key. In turn, at block 480, the navigation system computes the checksum or CRC of the authorization key and compares that value to the value C that it retrieved from the value V. If value C does not match, then, at block 482, the navigation system may refuse to access the database. Alternatively, if value C matches, then the navigation system continues to block 484. At block 484, the navigation system extracts from the authorization key the value K', and, at block 486, the navigation system XORs or otherwise combines K' with H so as to reveal the value K.

At block 488, the navigation system may use other parameters of the authorization key to validate use of the database. Finally, assuming successful validation, at block 490, the navigation system may use the value K as a symmetric key to decrypt the encrypted critical portion of the database and may proceed to access and use the data portion of the database.

In still a further exemplary embodiment, the process of securing geographic data can be additionally enhanced, still tying the authorization key to environmental parameters. In this further embodiment, the authorization server may first generate a random number K and may then use that random number K as a key to symmetrically encrypt the critical portion of the database. The authorization server may then compile a first portion A' of an authorization key, including parameters such as a pointer to a randomly selected location of the database and a value at that location, starting and ending dates for data validity, maximum use count, and information about selected options. The authorization server may also include in the first portion A' one or more values computed as a one-way hash function of the critical portion of the database.

The authorization server may then apply a one-way hash function, whose inputs may be the navigation system ID, the storage device ID, the first portion A' of the authorization key, some number of bytes from the encrypted critical portion, and/or other parameters that may be accessible by both the navigation system and the authorization server. The output of the hash function may be designated H.

The authorization server may then XOR the output H with the random number K, so as to produce a value K'. In turn, the authorization server may store the value K' in a second portion A" of the authorization key. The authorization server may then calculate a CRC or hash function of A' and K' (or perhaps just a CRC or hash function of just A') and store the result in the second portion A" as well.

Next, the authorization server may append or otherwise combine together A' and A" to produce an authorization key A. The authorization server may then encrypt the authorization key with the navigation system's private key (or public key). Finally, the authorization server may send to terminal 20 the symmetrically encrypted critical portion of the database and the encrypted authorization key.

Upon receipt of this information, terminal 20 may record the information onto the data storage device 22, together with the unintelligible portion of the database. Thereafter, when the data storage device is coupled with the navigation system, the navigation system may use its public key (or private key) to decrypt the encrypted authorization key, so as to recover the plaintext authorization key A.

The navigation system may then compute the same CRC or hash function of A and K' that the authorization server computed and may compare the result with the value stored in the second portion A" of the authorization key. If the values do not match, then the navigation system may be programmed to abort its efforts to access the data.

The navigation system may next check to ensure that the current date is between the starting and ending dates provided in the first portion A' of the authorization key. If the current date does not fall within the allowed date range, then the navigation system may also be programmed to abort.

The navigation system may then compute the same hash function that the authorization server computed, with the same inputs used by the authorization server, so as to produce the output H. In turn, the navigation system may XOR the value H with the value K' that is stored in the second portion A" of the authorization key, so as to recover the value K. Thereafter, the navigation system may use the value K as a key to symmetrically decrypt the encrypted critical portion of the database and may then proceed to access and use the data portion of the database.

In this exemplary embodiment, the navigation system would therefore need to have access to environmental parameters such as the navigation system ID and storage device ID as used in the hash function computed by the authorization server. Absent access to such information, the navigation system would be prevented from computing the value H, which would prevent the navigation system from uncovering the value K needed to symmetrically decrypt the critical portion of the database.

Further, in an arrangement where the authorization server included in first portion A' one or more hash values of the critical portion of the database, the navigation system may be programmed to verify those hash values by computing the same hash function as applied by the authorization server and comparing the resulting values.

D. Exemplary Advantages

The system and method described by way of example in this specification can advantageously help avoid many of the security risks associated with providing valuable data, such as geographic data. For instance, in various embodiments, the system and method can help foil attempts at fraud in the following manners:

1. If someone tries to copy the data to another storage device, the machine seeking to access the data may determine that the storage device is not authorized to hold the data and may therefore refuse to access the data.
2. If someone tries to access the data using a machine other than the authorized machine, the machine may determine that it is not authorized to access the data and may therefore refuse to access the data.
3. If someone tries to use the authorization key to access data other than the data for which the authorization key was generated, access may be precluded.
4. If someone tries to use an expired set of data (such as a database for which a rental period or number of uses has expired), access may be precluded.
5. If someone tries to access the data using a machine that is not programmed to perform validation, access may be precluded.

In addition, the exemplary embodiments provide additional security features. For example, a random encryption key is used for each instance of a database, thereby helping to prevent certain types of cryptanalysis. As another example, by tying authorization to database access libraries (e.g., the critical portion of a database), authorization becomes required in order to access the database. Therefore, navigation system vendor may have to include authorization functions in their systems.

E. Alternative Embodiment

Figure 13:
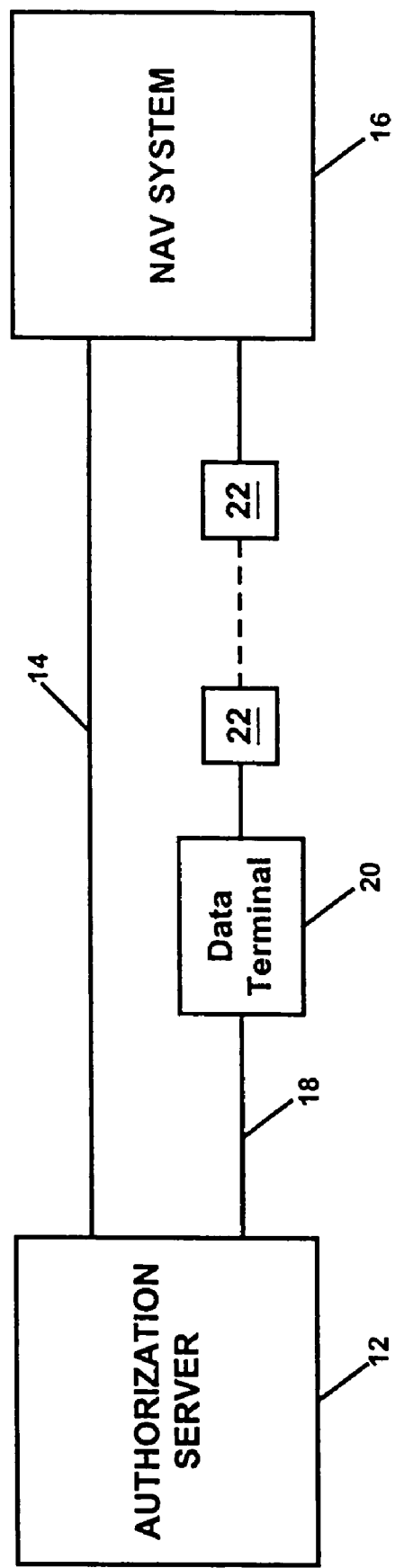
FIG. 13 is a block diagram illustrating an alternative system arranged to facilitate mass distribution of geographic data to one or more navigation systems in accordance with an exemplary embodiment.

In an alternative embodiment of the present invention, some or all of the geographic data or authorization information can be provided more directly from the authorization server to the navigation system. FIG. 13 is a simplified block diagram illustrating this alternative embodiment by way of example.

In this alternative embodiment, as shown in FIG. 13, a communications link 14 couples the authorization server 12 to a representative navigation system 16. Link 14 may take any form suitable for carrying communications between authorization server 12 and navigation system 16. For instance, link 14 may include or take the form of a satellite or cellular communications system or other wireless interface and/or the public switched telephone network or other landline interface. As such, link 14 may include various intermediate elements as well (not shown in FIG. 13).

In this embodiment, the data interface units 32, 70 of authorization server 12 and navigation system 16 then take a form suitable for communicating with link 14. Alternatively, authorization server 12 and/or navigation system 16 each include an additional data interface unit suitable for communicating with link 14. For instance, if link 14 is a cellular telecommunications network, then navigation system 16 preferably includes the components that would ordinarily be found within a cellular telephone or other mobile station (such as an appropriate RF transceiver and the program logic necessary to originate and terminate calls, for example).

In this embodiment, authorization server 12 can itself convey the entire secured geographic database to navigation system 16 via link 14. In particular, authorization server 12 preferably prepares and provides to navigation system 16 (i) the authorization material (e.g., encrypted critical portion and authorization parameters, etc.) described above as being provided by authorization server 12 to data distribution terminal 20 and (ii) the data portion 62 of a geographic database to be used by the navigation system 16. The authorization server may provide this material to the navigation system on request or in response to another specified stimulus. Further, in the event the navigation system already has the data portion 62 of a given database, the authorization server may conveniently send only the authorization material to the navigation system. The navigation system 16 may then employ a process equivalent to that described above, to decrypt, validate and use the database.

As shown in FIG. 13, communications link 18, data terminal 20, and portable data storage device 22 may also still be employed to carry information from authorization server 12 to navigation system 16 in this alternative embodiment. In this arrangement, for instance, some information may be conveyed via link 14 to the navigation system 16, and other information may be conveyed via link 18 to data terminal 20 and then via portable storage device 22 to navigation system 16.

As a particular example, a user may load the data portion 62 of a database onto storage device 22 at terminal 20, for instance, and then couple the storage device with a navigation system 16. In providing the user with the data portion 62, terminal 20 may communicate with authorization server 12 to an extent as provided above, and authorization server 12 may establish the necessary authorization material (e.g., encrypted critical portion and authorization parameters, etc.) Unlike the above scenario, however, authorization server 12 might not send the authorization material to terminal 20. When navigation system 16 then detects the presence of the storage device 22, it may be programmed to responsively contact authorization server 12 via link 14 (e.g., by placing a cellular telephone call to the authorization server) and to request the authorization material. Authorization server 12 may then send the authorization material, and navigation system 16 may use the authorization material to facilitate access to the database.

As still another variation of this alternative embodiment, link 14 may itself comprise portable data storage device 22, which may be physically transported from authorization server 12 (or another entity) to navigation system 16. In this arrangement, for instance, authorization server 12 may record onto storage device 22 all of the information that terminal 20 would have recorded onto the storage device in the embodiments described above and then provide the storage device for use in navigation system 16.

In this variation, for instance, a user may order a particular set of geographic data from a data provider, such as via the Internet or via a call center. The data provider may obtain the user ID, navigation system ID and other information (such as the information that terminal 20 would obtain in the embodiments described above) and then employ the authorization server to generate and record onto a storage device 22 the requested data set. The data provider may then ship or otherwise transport the loaded storage device 22 to the user for use by the navigation system as described above.

F. Conclusion

Examples of the present invention have been described above. Those skilled in the art will understand, however, that changes and modifications may be made in these embodiments without departing from the true scope and spirit of the present invention, which is defined by the following claims.

For example, where the above description notes that certain logic functions may be carried out by a processor executing software instructions, those functions can equally be employed through hardware, firmware, or a combination of hardware, firmware and software if desired.

As another example, while the foregoing description has focused on securing geographic data and providing geographic data for use by a navigation system, the elements, systems and processes described can be equally employed to secure and communicate other types of data for use in other contexts. Examples of such other data include those described in the background section (e.g., data for music players or video players (such as songs or movies), data for video game consoles (such as games, etc.), as well as other sorts of data now known or later developed.

I claim:

1. A method of operating a computing platform, the method comprising:

receiving a secured data product comprising an encrypted first portion of the data product and an unencrypted second portion of the data product, wherein said first portion of the data product comprises indices into data contained in the second portion of the data product, said encrypted first portion being unusable by the computing platform before decrypting said encrypted first portion and said unencrypted second portion being unusable by the computing platform before decrypting said encrypted first portion, wherein the data product includes an encrypted authorization key;

decrypting said encrypted first portion with a decryption key to obtain said indices into data contained in the second portion;

decrypting said encrypted authorization key to obtain verification information; and executing an application program on the computing platform to use the data product including both the decrypted first portion and the second portion for an intended purpose, wherein to use the data product for said intended purpose said indices are used to obtain said data contained in the second portion of the data product, wherein said application program is not included with said data product, wherein said application program being installed on said computing platform prior to said step of receiving said secured data product.

2. The method of claim 1 wherein said first portion of the data product includes decompression parameters for the data product.

3. The method of claim 1 wherein said first portion of the data product comprises global data pertaining to the data product as a whole.

4. The method of claim 1 wherein said verification information comprises an ID code associated with a computing platform entitled to access the data product.

5. The method of claim 1 wherein said verification information comprises an ID code associated with a storage medium entitled to hold the data product.

6. The method of claim 1 wherein said verification information comprises an ID code associated with a user entitled to use the data product.

7. The method of claim 1 wherein said decrypting said authorization key provides said decryption key for decrypting said first portion of the data product.

8. A computing system comprising:

a processor;

a data storage medium coupled to said processor, the data storage medium holding a set of data comprising an encrypted first portion of a data product and an unencrypted second portion of the data product wherein the first portion comprises critical data that enables use of the data product, wherein said critical data is not a decryption key, wherein the first portion of the data product being unusable by the computing platform before decrypting said encrypted first portion and the second portion of the data product being unusable before decrypting the first portion of the data product, wherein said set of data comprises an encrypted authorization key;

a routine executable by the processor for decrypting the encrypted first portion of the data product, thereby enabling a program executable by said processor to use the data product including both the first portion and the second portion for an intended purpose, wherein said program is not included with said data product; and a second routine executable by the processor for decrypting the encrypted authorization key to obtain verification information to validate use of the data product.

9. The system of claim 8 wherein said data product is a geographic database.

10. The system of claim 8 wherein said critical data includes decompression parameters for the data product.

11. The system of claim 8 further comprising a second routine executable by the processor for decrypting the encrypted authorization key to obtain a decryption key for decrypting the first portion of the data product.

12. A data product stored on a storage medium comprising:

an encrypted first portion; and an unencrypted second portion, wherein said first portion comprises critical data that when decrypted enables a program executed on a computing platform to use the data product including both said first portion and said second portion for an intended purpose, wherein said first portion comprises indices into data contained in the second portion of the data product, wherein the encrypted first portion being unusable before decrypting said encrypted first portion and the unencrypted second portion of the data product not being usable before decrypting the encrypted first portion of the data product to obtain the indices, said program is not included with said data product, wherein said encrypted first portion includes an authorization key that provides verification information when decrypted.

13. The data product of claim 12 wherein said data product comprises a geographic database.

14. The data product of claim 12 wherein said critical data comprises global data pertaining to said data product as a whole.

* * * * *

UNITED STATES PATENT AND TRADEMARK OFFICE
CERTIFICATE OF CORRECTION

PATENT NO.         : 7,640,595 B2
APPLICATION NO. : 10/823132
DATED              : December 29, 2009
INVENTOR(S)        : Robert Chojnacki It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 998 days.

Signed and Sealed this

Sixteenth Day of November, 2010

David J. Kappos
*Director of the United States Patent and Trademark Office*